US009925737B2

(12) United States Patent
Nishiyama et al.

(10) Patent No.: US 9,925,737 B2
(45) Date of Patent: Mar. 27, 2018

(54) MULTI-LAYER PANEL

(71) Applicant: HONDA MOTOR CO., LTD., Tokyo (JP)

(72) Inventors: Kimito Nishiyama, Saitama (JP); Akira Goto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/120,216

(22) PCT Filed: Feb. 18, 2015

(86) PCT No.: PCT/JP2015/054497
§ 371 (c)(1),
(2) Date: Aug. 19, 2016

(87) PCT Pub. No.: WO2015/125837
PCT Pub. Date: Aug. 27, 2015

(65) Prior Publication Data
US 2017/0057198 A1    Mar. 2, 2017

(30) Foreign Application Priority Data
Feb. 19, 2014  (JP) ................. 2014-029060

(51) Int. Cl.
*B32B 3/28*     (2006.01)
*B60P 1/43*     (2006.01)
*B32B 15/01*    (2006.01)

(52) U.S. Cl.
CPC ............. *B32B 3/28* (2013.01); *B32B 15/016* (2013.01); *B60P 1/43* (2013.01); *B32B 2307/54* (2013.01); *B32B 2605/00* (2013.01)

(58) Field of Classification Search
CPC ....................................... B32B 3/28
See application file for complete search history.

(56) References Cited

U.S. PATENT DOCUMENTS 3,950,585 A * 4/1976 Hale ................ E04C 2/3405
                                                      428/179
4,348,798 A * 9/1982 Hutchison ............ F24J 2/14
                                                      228/182

FOREIGN PATENT DOCUMENTS

CN    201694110    1/2011
JP    51-16898     5/1976
(Continued)

OTHER PUBLICATIONS

English machine translation of JP2006-097461A dated Jun. 26, 2017.*
(Continued)

*Primary Examiner* — Adam Krupicka
(74) *Attorney, Agent, or Firm* — Rankin, Hill & Clark LLP

(57) ABSTRACT

A multi-layer panel is provided, which may eliminate local portions having low strength and low rigidity and may suppress a stress concentration to increase rigidity and strength. The multi-layer panel includes a core panel; a pair of face plates sandwiching the core panel from both sides; and a beam member. The core panel has a standing portion extending in a direction intersecting with a surface of the multi-layer panel, and a flange formed in a manner of extending from a most outside end of the standing portion along a first one of the face plate. The beam member includes a portion with the rectangular cross section disposed so as to clamp the flange of the core panel with the first face plate.

5 Claims, 19 Drawing Sheets

(56) References Cited

FOREIGN PATENT DOCUMENTS

| JP | S58-188275   | 12/1983 |
|----|--------------|---------|
| JP | S62-91814 U  | 6/1987  |
| JP | S63-184931   | 11/1988 |
| JP | H02-289158   | 11/1990 |
| JP | H08-4254     | 1/1996  |
| JP | H10-86222    | 4/1998  |
| JP | H10-266446   | 10/1998 |
| JP | 2003-226186  | 8/2003  |
| JP | 2006-097461  | 4/2006  |

OTHER PUBLICATIONS

Japanese Office Action dated Dec. 13, 2016 (English translation included).
Chinese Office Action dated Apr. 1, 2017, English translation included, 18 pages.

* cited by examiner

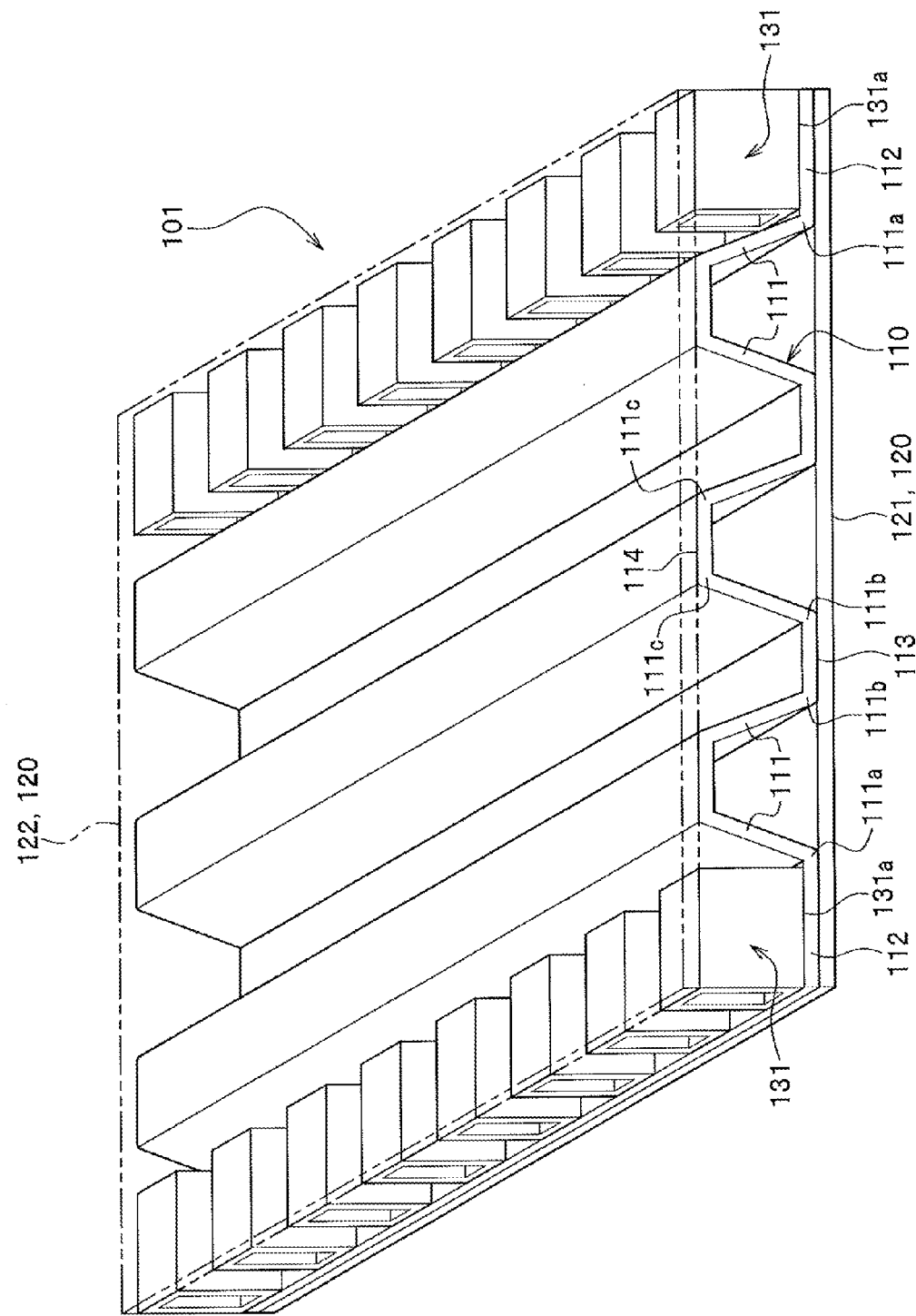

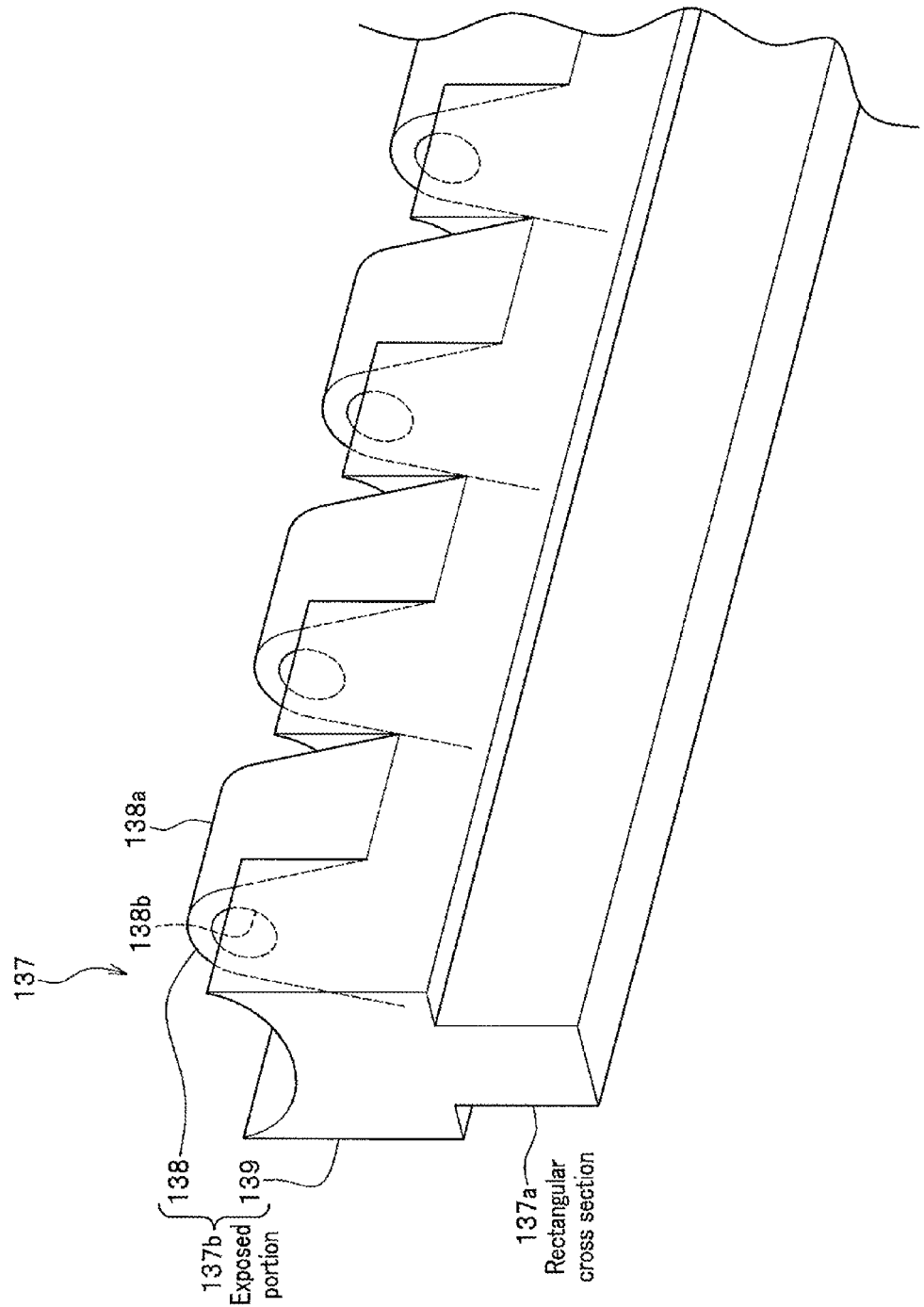

| Example No. | Length: a (mm) | Load Point: x (mm) | Flange clamp | Stress ratio |
|---|---|---|---|---|
| A | -4 | 14 | Yes | 1.00 |
| B | 0 | 14 | Yes | 0.89 |
| C | 6 | 14 | Yes | 0.61 |
| D | 10 | 14 | Yes | 0.48 |
| E | 6 | 14 | No | 0.86 |

MULTI-LAYER PANEL

TECHNICAL FIELD

The present invention relates to a multi-layer panel.

BACKGROUND ART

Some vehicles may lay down a slope from an opening at a vehicle rear portion to a backward ground of the vehicles, in order to mount a large luggage, a wheelchair on which a care-receiver is riding, and the like, on a space in the vehicle rear portion.

Patent Document 1 describes a vehicular slope device, which includes a plurality of slope portions slidably connected with each other and puts down the slope portions from a vehicle onto the earth in a developed state to allow loading and unloading of a wheelchair or the like. The vehicular slope device described in Patent Document 1 has a floor member molded by extruding aluminum alloy. To extrude and mold a floor member, a body of the slope needs to have a uniform sectional shape along a direction of the extrusion.

Patent Document 2 describes a truck gate including a multi-layer structure having a metallic flat plate, a corrugated plate, and a flat plate at an outer surface side; and a plate material having a shock absorbing ability at an inner surface side.

CITATION LIST

Patent Literature

[PTL 1]
Patent Document 1: Japan patent publication JP2003-226186 (FIG. 1)
[PTL 2]
Patent Document 2: Japan Utility Model publication S58-188275 (FIG. 1)

SUMMARY OF INVENTION

Technical Problem

The vehicular slope device described in Patent Document 1 has a floor member molded by extruding aluminum alloy. To extrude and mold the floor member, a body of the slope needs to have a uniform sectional shape along a direction of the extrusion.

In this case, to extrude and mold a floor member, a body of the slope needs to have a uniform cross-sectional shape along a direction of the extrusion. Thus, for example, a rib or the like for reinforcing the floor member needs to be formed in a uniform cross-section along the extrusion direction.

Therefore, it is impossible to limit a place where a rib is provided only into the middle of the direction of extruding the floor members, but a rib needs to be formed at a place which does not require a rib (e.g., at the front portion of the floor member in the direction of the extrusion).

Further, it is impossible to provide a rib in a direction crossing the direction of the extrusion, and thus impossible to provide a rib at a place that needs to increase rigidity and strength.

It is considered that configuring a slope by using the multi-layer structure described in Patent Document 2 requires no extrusion of the slope body like the vehicular slope device disclosed in Patent Document 1, and thus allows for suppression of a weight and cost of the slope.

The device disclosed in Patent Document 2, however, is an invention devised for using it for the gate of the truck, and is not intended to solve a problem to reinforce places desired to be strengthened. For example, when reinforcing the multi-layer structure disclosed in Patent Document 2 to use it for a slope, a portion of the corrugated plate may be cut out to fit therein a core material such as a beam member. However, there occurs a problem that cutting out a corrugated plate may deteriorate strength and rigidity at a boundary between the core material and a portion of the corrugated plate surrounding the core material.

Solution to Problem

The present invention has been made in view of those problems and has an object to provide a multi-layer panel that may eliminate portions that become locally weak in strength and rigidity, and suppress stress concentration to increase the rigidity and strength.

In order to solve the above problems, the present invention provides a multi-layer panel comprising: a core panel; a pair of face plates configured to sandwich the core panel from both sides; and a beam member, the core panel including: a standing portion configured to extend in a direction intersecting with a surface of the multi-layer panel; and a flat portion formed in a manner of extending along the surface of the multi-layer panel from an end of the standing portion, and the beam member configured to be disposed along an end of the face plate and have a portion with the rectangular cross section disposed such as to sandwich the flat portion of the core panel with a first one of the face plates.

Such kind of structure may make the core panel being present also under the beam member to allow the core panel to be provided on an entire surface of the multi-layer panel, and thus, eliminate a portion locally having low strength and low rigidity, and suppress the stress concentration to increase the rigidity and strength of the multi-layer panel. Further, in a case of clamping an end of the multi-layer panel with an end cover member (e.g. rail) in order to reinforce the portion having low strength and low rigidity, any extended portion may not be needed on the end cover member. Therefore, the above-mentioned structure may provide the carriage bed having the broadest effective area without reducing an area of the surface material, in a case of utilizing the multi-layer panel, for example, as a slope.

The beam member may include a protruding portion configured to have a shape of protruding in a direction intersecting with surfaces of the pair of the face plates and to have an inner side of the protruding portion abutted by ends of the pair of the face plates.

The above configuration may allow the protruding portion of the beam member to be in contact with the ends of the pair of face plates, and thereby enable positioning of the beam member relative to the pair of the face plates of the multi-layer panel to enhance assemblability of the multi-layer panel. Further, positioning of the beam member may be made with high accuracy, allowing a high accuracy arrangement of the beam member at a portion required for rigidity and strength.

According to the multi-layer panel of the present invention, a protruding height of the protruding portion may be less than a thickness of the corresponding one of the pair of the face plates.

If the protruding portion is longer than a thickness of the corresponding one of the pair of the face plates, the protruding portions would protrude the surface of the face plates (surface that is opposite to a surface facing to the core panel). This causes a situation that a load received by the multi-layer panel would be applied on the protruding portions prior to the pair of the face plates, which results in the concentration of the stress into the protruding portions. Setting the length of the protruding portion shorter than a thickness of the corresponding one of the pair of the face plates may make the protruding portions not protrude beyond the surface of the corresponding one of the face plates, to distribute and receive the load on the face plate and to suppress the stress concentration. In addition, when the end portion of the multi-layer panel is clamped by the rail, the protruding portion is out of the way, which enables securely clamping the face plates with the clamping portion of the rail.

According to the multi-layer panel of the present invention, the beam member includes an exposed portion configured to be provided immediately beside ends of the pair of the face plates, to extend from the portion with the rectangular cross section in a direction along surfaces of the pair of the face plates, and to be exposed from the ends of the pair of the face plates.

The above configuration may allow attaching a component mounting portion onto the exposed portion exposed from the portion with the rectangular cross section to mount various components, or mounting the multi-layer panel itself onto a vehicle body part or the like, which may enhance usefulness of the multi-layer panel.

According to the multi-layer panel of the present invention, the exposed portion is configured to include a hinge portion or a component mounting portion on which a component is mounted.

As described above, making the exposed portion become the hinge portion, for example, when using the multi-layer panel for the carriage bed of the slope, allows easily providing a hinge portion in the slope to enhance usability of the multi-layer panel. In addition, attaching the component mounting portion onto the exposed portion enables mounting a component of the multi-layer panel, or mounting the multi-layer panel itself onto a vehicle body or the like.

According to the multi-layer panel of the present invention, a plurality of the hinge portions are formed at locations spaced apart by a predetermined distance from one another along a longitudinal direction of the beam member; a plurality of recess portions are formed between the hinge portions; a cross-sectional shape of an edge of the hinge portion that protrudes from the beam member is formed in a curved cross-sectional shape; a cross-sectional shape of the recess portion is formed in a curved cross-sectional shape that may receive the edge of the hinge portion; and when two of the multi-layer panels are coupled, the hinge portions of a first multi-layer panel are engaged with the recess portions of a second multi-layer panel, and thereby, the second multi-layer panel is supported rotatably with respect to the first multi-layer panel.

The above configuration may make the cross-sectional shapes of the hinge portion and the recess portion be a curved cross-sectional shape, and thereby may minimize a gap between the hinge portion and the recess portion to suppress a finger or a foreign matter sandwiched by the gap.

The multi-layer panel according to the present invention includes a foreign-matter-mixing prevention means between the hinge portion and the recess portion. Such a configuration provides a rubber sealing member, a brush, or the like to allow more reliable prevention of the foreign matter from mixing.

According to the multi-layer panel of the present invention, the exposed portion includes an inclined surface portion configured to be inclined from the first one of the face plates toward a second one of the face plates.

Such a configuration of the multi-layer panel, for example when used in the slope of the multi-layer panel, may reduce a difference in level between the multi-layer panel and the ground plane by this inclined surface portion to improve mountability of an object (for example, wheelchair).

The multi-layer panel according to the present invention includes an end cover member having a clamping portion configured to clamp ends of the pair of the face plates.

Such a configuration of the multi-layer panel may allow a load transmitted to the beam member through the multi-layer panel to be transmitted also to the end cover member (for example, rail) to perform a load distribution, and allow the rigidity and strength of the multi-layer panel to be improved.

According to the multi-layer panel of the present invention, the beam member is coupled to the pair of the face plates by jointing, adhesion, or fastening.

Such a configuration of the multi-layer panel may allow the coupling (including jointing, bonding, and fastening) of the beam member with the face plates to suppress a positional deviation of the beam member with respect to the face plates and to fix the beam member at a portion requiring the rigidity and strength.

According to the multi-layer panel of the present invention, the beam member is formed in a manner of protruding further than the clamping portion in an inward direction perpendicular to an end portion of the multi-layer panel.

Such a configuration of the multi-layer panel may change rigidity in a stepwise manner from the clamping portion toward the beam member portion, the core panel, and further the face plates, and thereby may disperse the stress to reduce the stress that locally concentrates.

According to the multi-layer panel of the present invention, the flat portion of the core panel may be clamped between the portion with the rectangular cross section of the beam member and a first one of the face plates that is a face plate opposite to the face plate receiving an external force Such a configuration of the multi-layer panel may, when a load is inputted in a direction perpendicular to the surface of the multi-layer panel, a compressive stress is applied on the surface that is a carriage bed, and a tensile stress is applied on the opposite surface to the carriage bed. A face plate, generally, has a lower proof stress against the tension stress than the compressive stress. Accordingly, a proof stress against the tensile stress may be enhanced by clamping the flat portion of the core panel (for example, the flange) between the face plates applied with the tensile stress and the beam member.

Advantageous Effects of Invention

The present invention may provide a multi-layer panel that may eliminate a local portion having low strength and low rigidity to suppress a stress concentration, and thereby increase rigidity and strength of the multi-layer panel.

BRIEF DESCRIPTION OF DRAWINGS

FIG. 7 is a sectional view showing a modification of a beam member of the multi-layer panel according to the embodiments of the present invention.

FIG. 17 is a perspective view of a hinge portion when the exposed portion of the beam member of the multi-layer panel according to the embodiments of the present invention is a hinge.

DESCRIPTION OF THE INVENTION

Embodiment

Embodiments of the present invention are described in detail with reference to the accompanying drawings. In the description, the same elements are denoted by the same reference signs and a duplicated description thereof is omitted. Note that the embodiment of the present invention denotes a traveling direction of the vehicle by "front", a backward direction of the vehicle by "rear", a vertically upper side by "top", a vertically lower side by "bottom", and a direction of a width of the car by "right-left".

Figure 1:
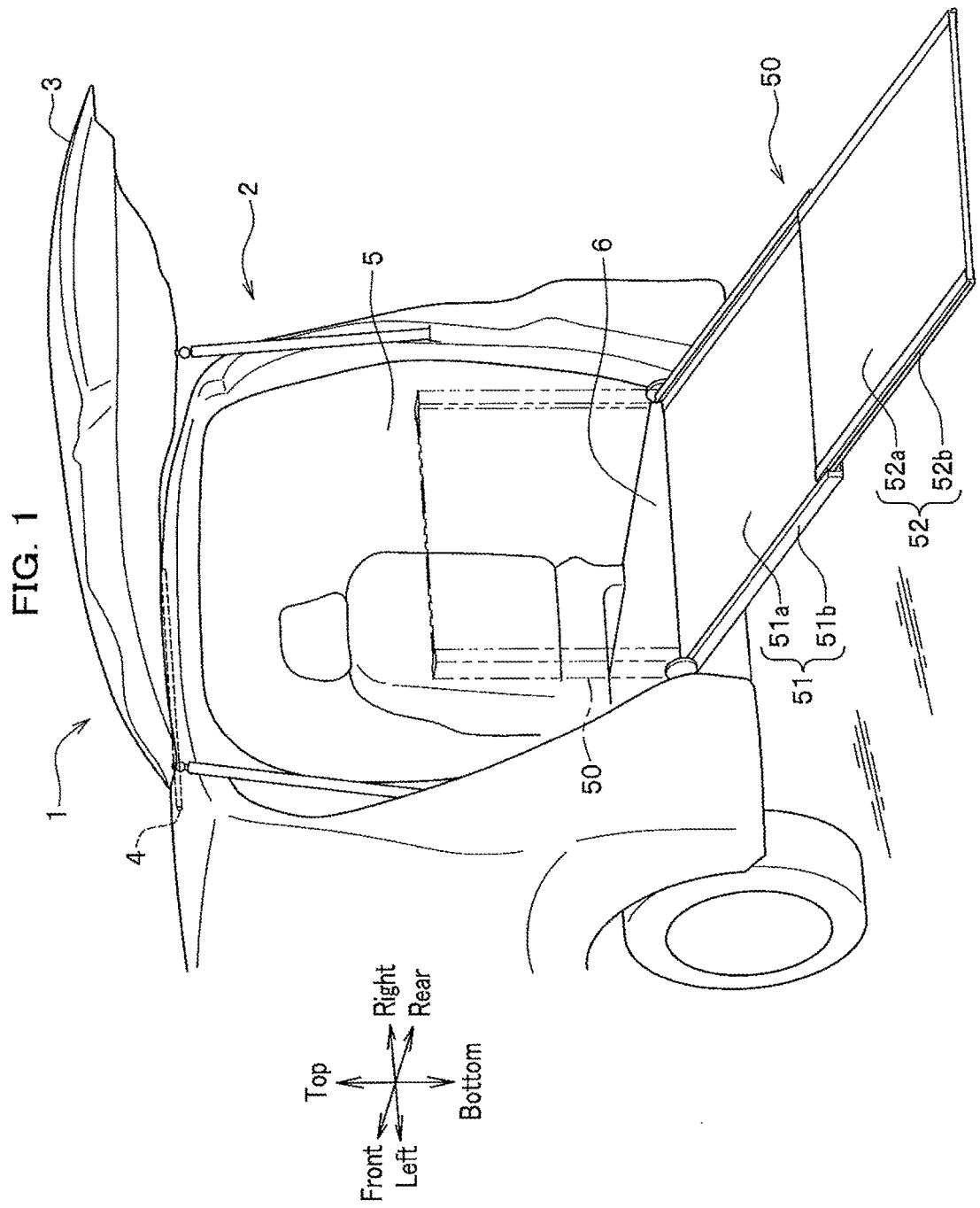
FIG. 1 is a perspective view showing a vehicle including a slope applied with a multi-layer panel according to an embodiment of the present invention.

As shown in FIG. 1, a vehicle 1 that is provided with the slopes applied with the multi-layer panel according to an embodiment of the present invention includes, for example, a one-box car, a station wagon, a hatchback, or the like. A rear part of the vehicle body 2 is provided with a flip-up back door 3 having a hinge portion 4. Note that the vehicle 1 may not be limited particularly to a specified type of vehicle in its type and shape, if it is provided with the back door 3 at the rear portion of the vehicle body 2.

As shown in FIG. 1, the rear portion of the vehicle body 2 has a vehicle rear opening 5 formed, which is opened and closed at the rear side by the back door 3. The back door 3 has an upper end rotatably attached to the hinge portions 4 located at right and left ends of an upper portion of the vehicle rear opening 5. This allows rotation of the back door 3 about the hinge portion 4 to open and close the vehicle rear opening 5.

A rear compartment of the vehicle body 2 is provided with a slope 50. This slope 50 is housed in a state of standing in a vicinity of the back door 3 when not used (see the broken line in FIG. 1), and brought down from the vehicle rear opening 5 behind the vehicle 1 and developed when used. It should be understood that the slope 50 may be brought down into the vehicle compartment to be accommodated in a state of being placed on a rear floor 6, when not used (see the broken line in FIG. 1), further that the slope 50 may be fixed to the right and left sides of the vehicle rear opening 5 in a standing state by a locking device (not shown), when not used.

Now, referring to FIG. 1, the slope 50 is described in detail. As shown in FIG. 1, the slope 50 is a two-stage slide slope, and includes a first slope 51 that has its end portion for the vehicular body attached rotatably relative to a lower hem of the vehicle rear opening 5 of the rear portion of the vehicle body 2; and a second slope 52 provided in such a way as to be able to slide with respect to an upper surface of the first slope 51 when the slope 50 is developed.

The first slope 51 is a lower stage slope, and includes a plate 51a that is a slope body, and two rails 51b provided at the left and right sides of the plate 51a. The second slope 52 is an upper stage slope, and includes a plate 52a that is a slope body, and two rails 52b provided at the left and right sides of the plate 52a.

Figure 2:
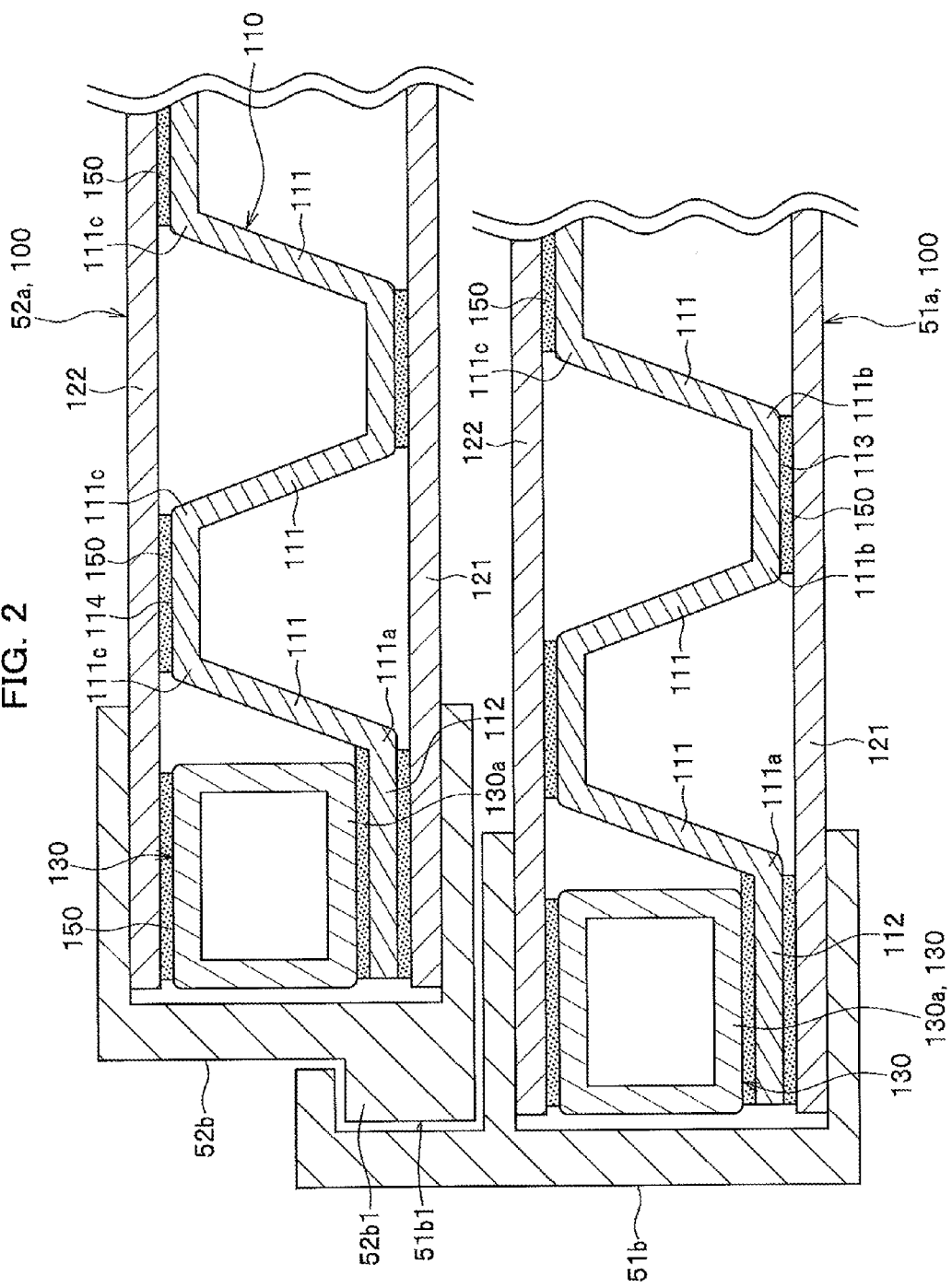
FIG. 2 is a cross-sectional view of a slope applied with the multi-layer panel according to the embodiment of the present invention.

As shown in FIG. 2, a protruding portion 52b1 formed on the outside of the rail 52b is slidably fitted into a recess portion 51b1 formed at the rail 51b of the first slope 51. A configuration of the multi-layer panel 100 forming a main part of the slope 50 is described below with reference to FIGS. 3 and 4.

A user, when using the slope, opens the back door 3 at the rear surface of the vehicle 1, sequentially slides the first slope 51 and the second slope 52 of the slope 50 behind the vehicle, develops the slope 50, and sets up it on a road surface or the like. In the developed state, the slope 50 forms a slope with a predetermined inclination angle.

The present invention has a feature in a reinforcing structure of an end portion of the multi-layer panel 100 included by the slope 50, and is not limited to the structure of two of the rails 52b in FIG. 2. Further, the present invention is directed to inner portions of the two of the rails 51b, i.e. a sandwiching portion for the two of the plates 51a, which sandwich end portions of the two of the plates 51a, but is not directed to an outer sliding structure of the slope 50 directly. Accordingly, a description below takes, for an example an end cover member 140 having a U-shaped cross sectional view to describe the present invention, excluding the outer sliding structure of the slope 50.

Figure 3:
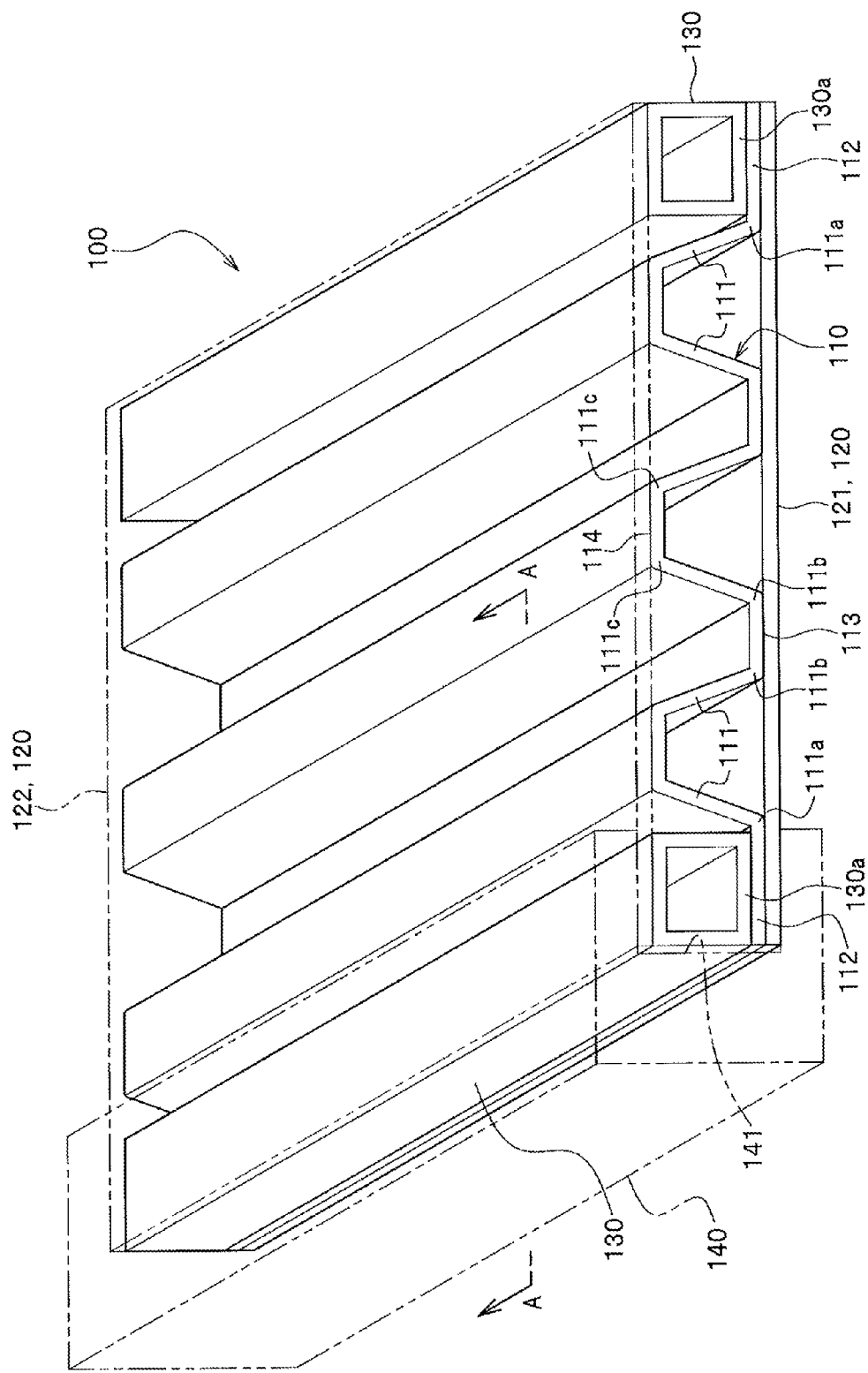
FIG. 3 is a perspective view showing a configuration of the multi-layer panel according to the embodiment of the present invention.
Figure 4:
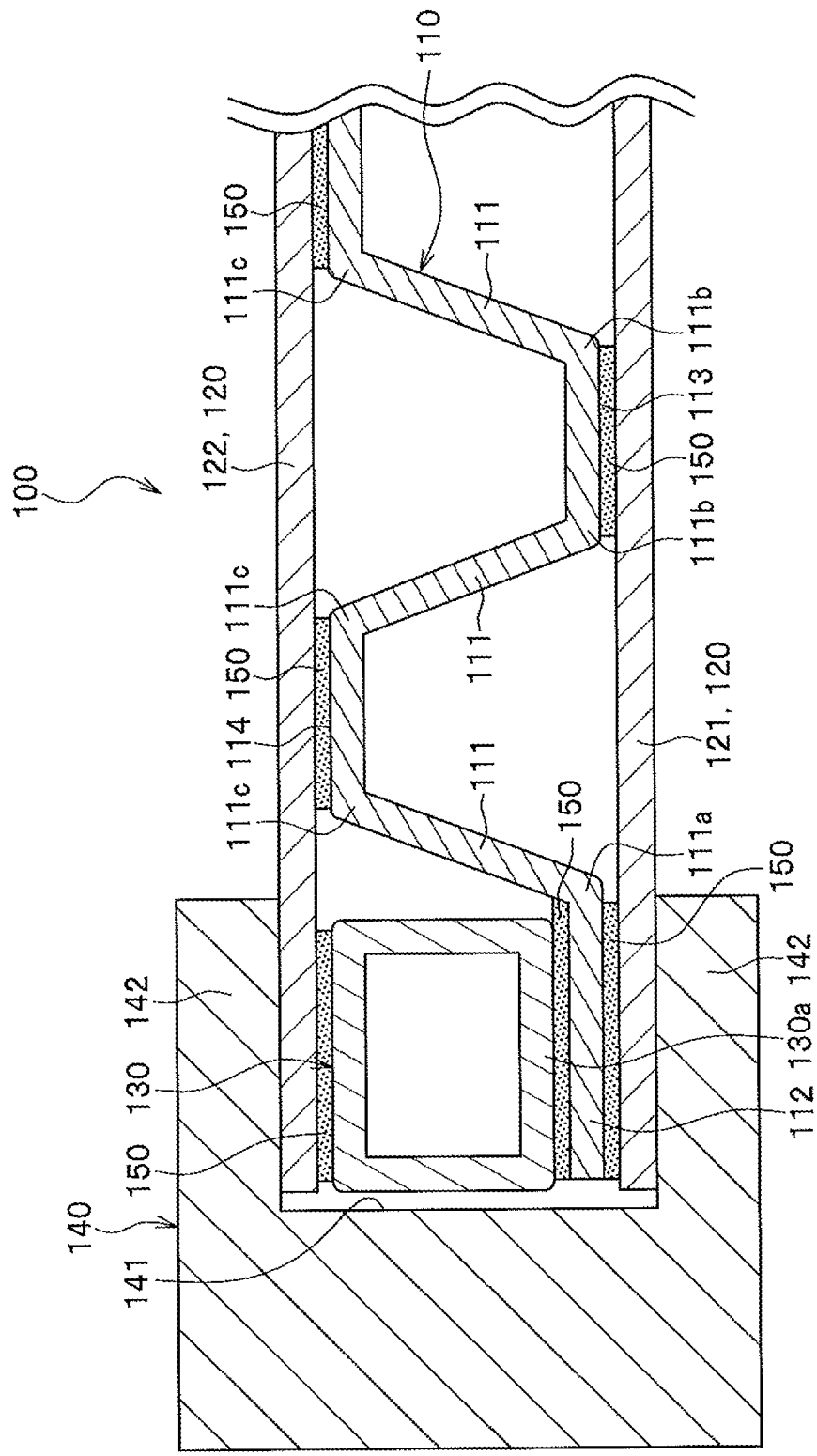
FIG. 4 is a cross-sectional view taken along a line A-A of FIG. 3.

As shown in FIGS. 3 and 4, the multi-layer panel 100 includes a core panel 110 having a standing portion 111 extending in a direction intersecting with a surface of the multi-layer panel, and a flange 112 (a flat portion described in claim 1) formed in a manner of extending from an end 111a of the standing portion 111 along the surface of the multi-layer panel; a pair of face plates 120 (a first face plate 121 and a second face 122) sandwiching the core panel 110 from both sides; and a beam member 130 having a portion with a rectangular cross section 130a, the portion with the rectangular cross section 130a sandwiching the flange 112 of the core panel 110 with a first face plate 121. That is, when viewed from the second face plate 122 (120), the multi-layer panel 100 is viewed as having a structure of the beam member 130 having the portion with the rectangular cross section 130a being arranged between the flange 112 of the core panel 110 and a second face plate 122 itself.

The end portion of the multi-layer panel 100 is clamped by clamping portions 142 of the end cover member 140 to be reinforced.

The multi-layer panel 100 can be used, for example, for the second slope 52 of the slope 50 (see FIG. 1).

<Core Panel>

The core panel 110 is made of, for example, aluminum alloy cold-pressed material. The core panel 110 includes the standing portion 111 extending in a direction intersecting with the pair of face plates 120 (121 and 122), and the flange 112 (one of flat portions) formed in a manner of extending from the most outside end 111a of the standing portion 111 along the first face plate 121 and being in surface contact with the first face plate 121; a first flat portion 113 formed in a manner of extending along the first face plate 121; a first folded portion 111b connecting the first flat portion 113 with first inner ends of the standing portion 111 at both sides, and a second flat portion 114 formed in a manner of extending along the second face plate 122, a second folded portion 111c connecting the second flat portion 114 with second inner ends of the standing portion 111 at both sides.

That is, the core panel 110 includes: the flange 112 that constitutes a part of a flat portion formed in a manner of extending from the most outside end 111a of the standing portion 111 along the first face plate 121; a first flat portion 113 formed to extend from the first folded portion 111b along the first face plate 121; a second flat portion 114 formed to extend from the second folded portion 111c along the second face plate 122. And as shown in FIG. 4, the standing portions 111, the first flat portions 113, and the second flat portions 114 form a corrugated plate in which trapezoidal shapes successively repeat in a sectional view.

Note that the aluminum alloy may be either non-heat-treatable or heat-treatable. The non-heat-treatable alloy may obtain strength by being as manufactured, or by cold processing such as rolling, extrusion, and drawing. Contrastingly, the heat-treatable alloy may obtain strength by a process such as quenching and tempering, and this case may get better effectiveness if bake hardening is utilized for adhesive heat curing.

The core panel 110 is described in more detail. The core panel 110 is formed by cold pressing an aluminum alloy cold-pressed material. That is, the core panel 110 is press-processed by bending a flat aluminum alloy cold-pressed material at the end 111a of the standing portion 111, the first folded portion 111b, and the second folded portion 111c, and folding in a direction intersecting with the face plates 120. This forms: a standing portion 111 becoming an inclined portion extending to the upper and lower portions of the multi-layer panel 100; the flange 112 that is sandwiched by the beam member 130 and the face plates 120 (121, 122) at right and left end portions of the multi-layer panel 100; and the first flat portion 113 and the second flat portion 114 that support the face plates 120 by planes extending in the direction of the width of the multi-layer panel 100.

Forming the standing portion 111 extending in an up-down direction of the multi-layer panel 100 may enhance the rigidity and strength in the up-down direction of the multi-layer panel 100. Further, forming the flanges 112 on the right and left ends of the core panel 110 allows the flanges 112 to be sandwiched between the beam members 130 and the first face plate 121.

It should be understood that the core panel 110 may have any structure, as long as the core panel 110 includes the flat portion (the flange 112 in the present embodiment) formed in a manner of extending from the end 111a of the standing portion 111 along the first face plate 121. For example, the standing portion 111 may be one extending in a lateral direction (width direction) of the multi-layer panel 100, alternatively, may be one extending in a vertical direction relative to the multi-layer panel 100 (orthogonal direction to the width direction). Alternatively, the standing portion 111 may be one extending in a combination of the vertical direction and the lateral direction, i.e., one having a so-called lattice shape structure or a honeycomb structure. Further, the standing portion 111 may have a modified cross-sectional structure such as a predetermined nested arrangement of a plurality of longitudinal ridges and lateral ridges.

<Face Plate>

The face plates 120 are made of, for example, aluminum alloy sheet. The face plates 120 includes a first face plate 121 and a second face plate 122 sandwiching the core panel 110 therebetween respectively from the top surface and the bottom surface of the core panel. The first face plate 121 and second face plate 122 may be enough to be the same only in a shape and size in the lateral direction (width direction) of the multi-layer panel 100, and may be different from each other in a vertical length or thickness, material, and the like. However, if the first face plate 121 and the second face plate 122 are made of the same material, reduction of procurement costs and improvement of workability may be obtained.

<Beam Member>

The beam member 130 is a reinforcing member for reinforcing a corresponding portion of the multi-layer panel 100. The beam member 130 is arranged between the pair of the face plates 120 (121, 122) in a manner of sandwiching the flange 112 of the core panel 110 with the first face plate 121. More specifically, the beam member 130 is disposed between the flange 112 and the second face plate 122 and coupled to the pair of the face plates 120 (121, 122).

Note that the "coupling" of the present invention is a concept including any of adhesion, fastening, and jointing, which is described below with reference to FIG. 10.

In the present embodiment, the beam member 130 has a portion with the rectangular cross section 130a, sandwiches the flange 112 of the core panel 110 between the portion with the rectangular cross section 130a and the first face plate 121, and is coupled to the flange 112 through an adhesive 150.

The beam member 130 is a rectangular pipe made of, for example, a hollow aluminum alloy extruded product. The beam member 130 may be solid, and its portion with the rectangular cross section may be of any cross-sectional shape. Furthermore, the beam member 130 is intended to reinforce the corresponding portions of the multi-layer panel 100, and therefore may have an arrangement, a shape, and a length in accordance with the corresponding portion.

<Adhesive>

As shown in FIG. 4, the multi-layer panel 100 has the core panel 110, the pair of the face plates 120 (121, 122), and the beam member 130 coupled (adhered) by an adhesive 150 to be unified. Specifically, portions of the multi-layer panel 100 that are adhered by the adhesive 150 are respectively: between the cross-sectional portion 130a of the beam member 130 and an top surface of the flange 112 of the core panel 110; between the bottom surface of the flange 112 and the first face plate 121; between the first flat portion 113 of the core panel 110 and the first face plate 121; between the beam member 130 and the second face plate 122; and between the second flat portion 114 of the core panel 110 and the second face plate 122.

<Rail>

The present embodiment uses the end cover member 140 as an example of an end cover member for covering the end portion of the multi-layer panel 100. The end cover member 140 is a rod-like member for running the multi-layer panel 100 in a predetermined direction, and reinforces the end portion of the multi-layer panel 100 and further functions as a protective member for protecting the end surfaces and corners of the end portion of the multi-layer panel 100.

The end portion of the multi-layer panel 100 is clamped by the clamping portions 142 of the end cover member 140 that is an end cover member.

In the present embodiment, the end cover member 140 used for an end cover member can be used, for example in the slope 50 (see FIG. 1). When using the multi-layer panel 100 as the slope 50 (see FIG. 1), the end cover member 140 constitutes a part of the sliding portion. For example, when the multi-layer panel 100 is used in the second slope 52 (see FIG. 1), the multi-layer panel 100 corresponds to the plate 52a that is a slope body, the end cover member 140 corresponds to the two of the rails 52b that are provided at both the right and left side ends of the plate 52a.

As shown in FIGS. 3 and 4, the end cover member 140 includes: a groove portion 141 that the end portion of the multi-layer panel 100 (the ends of the pair of the face plates 120 and the beam member 130) abuts against, and the clamping portions 142 clamping the end portion of the multi-layer panel 100. The end cover member 140 is disposed along the end portion of the multi-layer panel 100. For FIGS. 3 and 4, the end cover member 140 is disposed along the lateral end portions of the multi-layer panel 100 (FIGS. 3 and 4 show an example in which the end cover member 140 is disposed at only the left side portion of the multi-layer panel 100). The end portion of the multi-layer panel 100 is inserted into the clamping portions 142 until the end abuts against the groove portion 141 of the end cover member 140, and held by the clamping portion 142 of the end cover member 140. The end cover member 140 is a mating member to the multi-layer panel 100.

Providing the end cover member 140 having the clamping portions 142 for clamping the end portion of the multi-layer panel 100 while being disposed along the end portion of the multi-layer panel 100 allows a load transmitted to the beam member 130 through the multi-layer panel 100 to be transmitted also to the end cover member 140 to perform the load distribution, and to improve the rigidity and strength of the multi-layer panel 100.

Next, a description is made on an effect of the multi-layer panel 100 configured as described above.

<Comparison of the Present Embodiment with Comparative Example>

First, a comparative example to the multi-layer panel according to the present embodiment is explained.

Figure 5A:
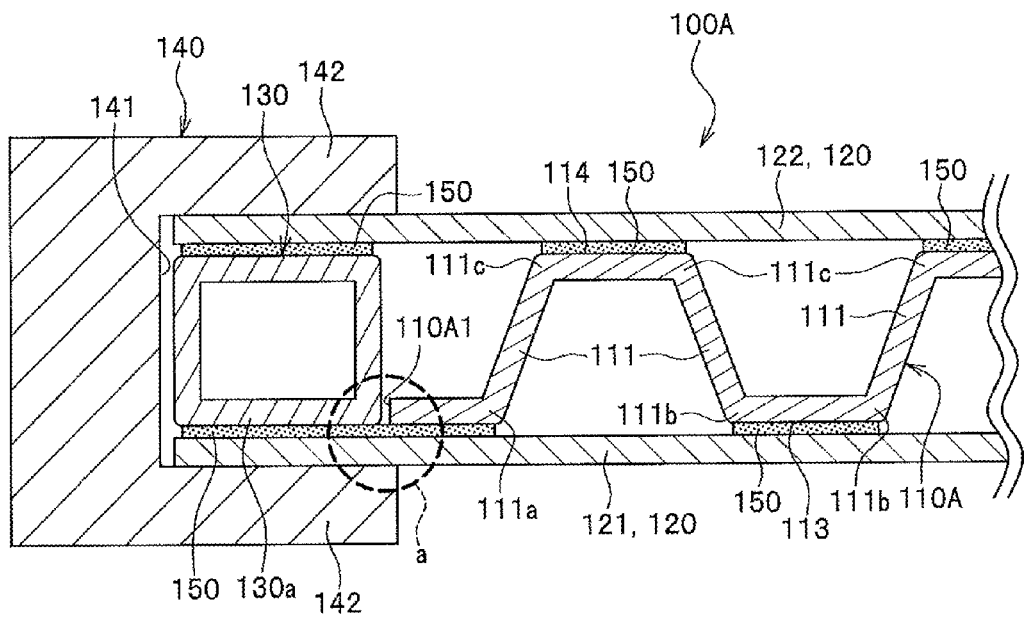
FIG. 5A is an explanatory view of a comparative example 1 to the multi-layer panel according to the first embodiment of the present invention.

As shown in FIG. 5A, the multi-layer structure 100A of a comparative example 1 includes a corrugated plate 110A that is a core material, a pair of face plates 120 (121, 122) sandwiching the corrugated plate 110A from both sides (upper and lower surfaces) thereof, and a beam member 130 reinforcing the multi-layer structure 100A. The beam member 130 is disposed besides a cutout portion 110A1 which is made by cutting out a part of the corrugated plate 110A (portion for arranging the beam member 130).

However, in the comparative example 1, since the beam member 130 is disposed just beside the cutout portion 110A1 of the corrugated plate 110A, a gap between the cutout portion 110A1 and the beam member 130 has only the first face plate 121 and becomes low in strength and rigidity, as shown in broken line of circle in FIG. 5A. That is, the gap between the cutout portion 110A1 and the beam member 130 has only the first face plate 121 between the cutout portion 110A1 and the beam member 130, and thus, the portion indicated by the broken line of circle in FIG. 5A may not only contribute to an overall reinforcement of the multi-layer structure 100A, but also may have a risk to become a starting point of deformation due to a concentration of shearing stresses between the cutout 110A1 and the beam member 130.

Figure 5B:
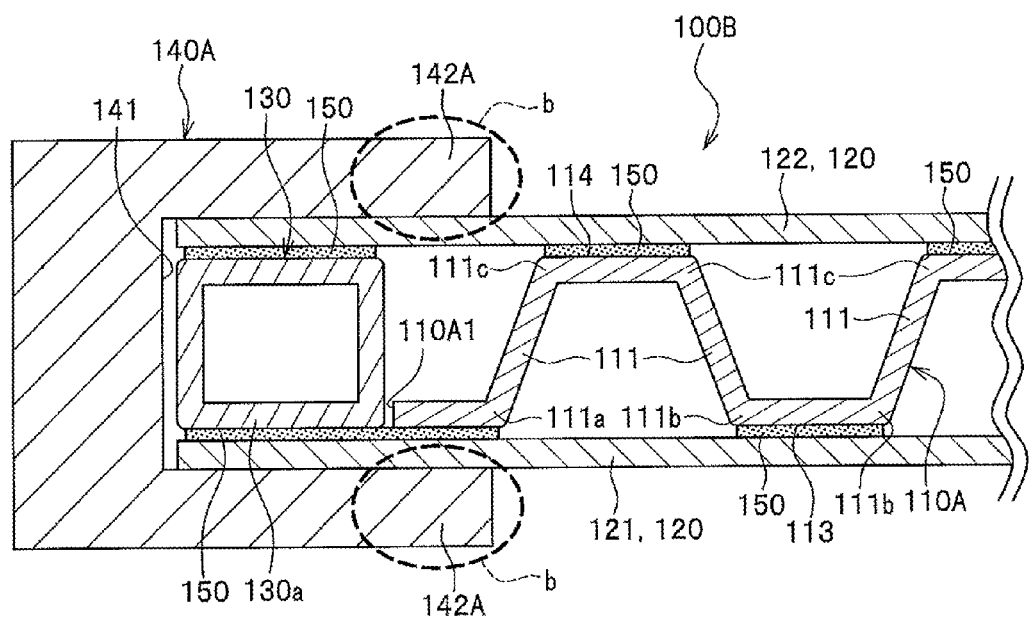
FIG. 5B is an explanatory view of a comparative example 2 to the multi-layer panel according to the first embodiment of the present invention.

An attempt to avoid this, as shown in FIG. 5B, may provide a structure that has longer clamping portions 142A of an end cover member 140A. In the comparative example 2 shown in FIG. 5B, a multi-layer structure 100B has an end portion clamped by the longer clamping portions 142A of the end cover member 140A. The clamping portion 142A of the end cover member 140A is longer than the clamping portion 142 of the end cover member 140 of FIG. 5A, and extends toward the center of the face plates 120 so as to cover the gap between the cutout portion 110A1 and the beam member 130.

The comparative example 2 has the longer clamping portions 142A of the end cover member 140A for clamping the end portion of the multi-layer structure 100B, as shown in broken line circle b in FIG. 5B. Therefore, the stress concentration portion shown by the broken line circle "a" in FIG. 5A may be reinforced by the longer clamping portions 142A. However, the longer clamping portions 142A may reduce the area of portions of the face plates 120 (121, 122) that are not clamped between the longer clamping portions 142A (i.e., an effectively usable area of the face plates 120), and then, an effective area of a portion used for a carriage bed decreases in the case of using the multi-layer panel 100 of the multi-layer structure 100B for the slope 50.

The multi-layer panel 100 according to the present embodiment, as shown in FIGS. 3 and 4, has the beam member 130 placed between the pair of the face plates 120 (121 and 122), and has an additional structure of clamping the flange 112 of the core panel 110 between the beam member 130 and the first face plate 121. That is, the flange 112 of the core panel 110 is placed so as to reach the whole of the bottom of the portion with the rectangular cross section 130a of the beam member 130. Therefore, there exists the core panel 110 even on the boundary portion between the core panel 110 and the beam member 130 (in other words, there is no gap on the boundary portion between the core panel 110 and the beam member 130 in the width direction of the multi-layer panel 100). This means that the core panel 110 may be provided over the entire surface of the multi-layer panel 100 in the width direction. Further, the flange 112 of the core panel 110 is configured so as to be clamped between the portion with the rectangular cross section 130a and the first face plate 121 of the beam member 130, and thereby, the core panel 110 can be provided over the entire surface perpendicular to the width direction of the multi-layer panel 100, although not shown.

Accordingly, the multi-layer panel 100 according to the present embodiment may eliminate portions having locally low strength and low rigidity comparing with the comparative example 1 (FIG. 5A) and suppress the stress concentration to increase the rigidity and strength of the multi-layer panel 100.

Further, the multi-layer panel 100 according to the present embodiment has no need to extend the clamping portion 142 of the end cover member 140 in a direction toward the panel center in order to reinforce the portion having low strength and low rigidity as the gap of the comparative example 2 shown in FIG. 5B, and therefore, may not reduce the effectively usable area of the face plates 120. If the slope 50 uses the multi-layer panel 100 according to the present embodiment, the carriage bed may have the maximized effectively usable area of the face plates 120.

[Arrangement of Beam Member and Flange]

The multi-layer panel 100 according to the present embodiment is provided with a flange 112 to the core panel 110 that is sandwiched by the pair of the face plates 120 (a first face plate 121, a second face plate 122), and between the flange 112 and the second face plate 122 is disposed the portion with the rectangular cross section 130a of the beam member 130. When the multi-layer panel 100 is applied to a panel to allow mounting an object (e.g. the panel included in the slope 50 shown in FIG. 1), compressive stress and tensile stress are generated in response to a force applied on a mounting surface by the mounted object, as shown in FIG. 6. Accordingly, in the present embodiment, the obverse and the reverse of the multi-layer panel 100 is distinguished from each other when the multi-layer panel 100 is installed.

Figure 6A:
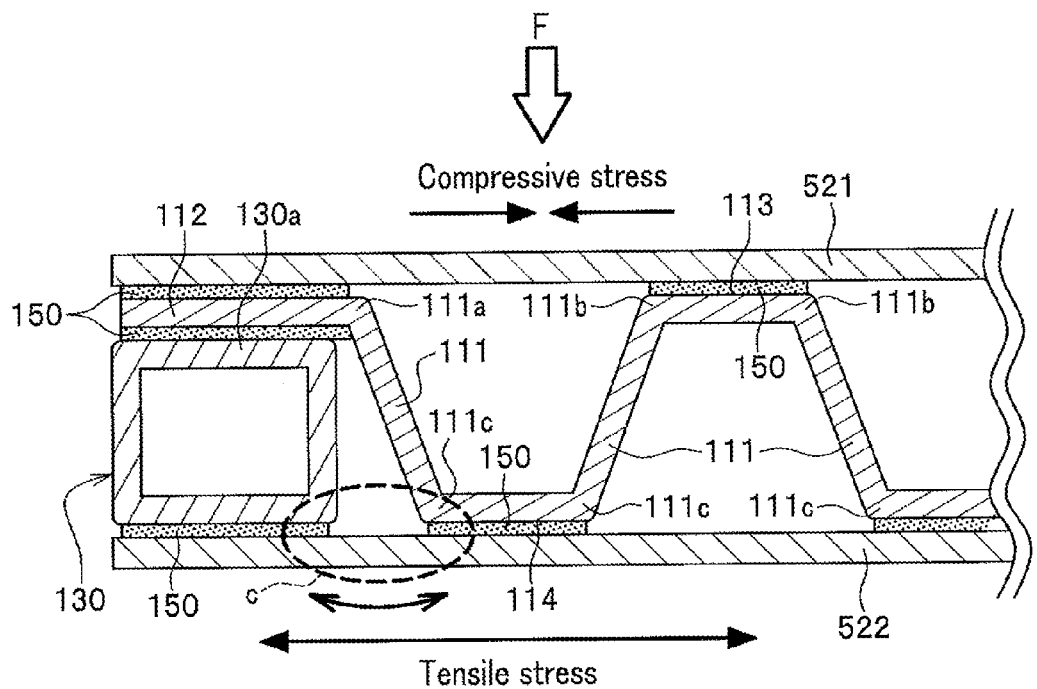
FIG. 6A is an explanatory view of a load when the multi-layer panel according to the first embodiment of the present invention is placed upside down.

First, as shown in FIG. 6A, a description is given for a case in which the multi-layer panel 100 is provided such that the flange 112 of the core panel 110 is placed on a face plate (face plate 521) on which an object is mounted. The case shown in FIG. 6A corresponds to a case of providing the multi-layer panel 100 according to the present embodiment upside down.

As shown with bold arrows in FIG. 6A, when a load F directing in a direction perpendicular to a surface is inputted, a compressive stress is applied on a surface (face plate 521) that is a carriage bed, and a tensile stress is applied on the opposite side (face plate 522). A face plate, generally, has a lower proof stress against the tension stress than the compressive stress. In the case shown in FIG. 6A, the face plates are more vulnerable to the tensile stress applied on the face plate 522 than the compressive stress applied on the face plate 521. More specifically, at portions of the face plate 522 other than joint portions by the adhesive 150 of the face plate 522 with the beam member 130 and the second flat portion 114 of the core panel 110, the tensile stress may be received by the face plate 522 alone, and thus, there may be a risk of deformation and rupture. In particular, a portion of the face plate 522 indicated by the broken line circle c in FIG. 6A, which is a portion between a joint portion of the beam member 130 and the face plate 522 at the end portion of the multi-layer panel 100 and a joint portion of the second flat portion 114 of the core panel 110 adjacent to the beam member and the face plate 522, may receive stronger tensile stress, and thus there is a concern that the deformation and rupture may more easily occur.

Figure 6B:
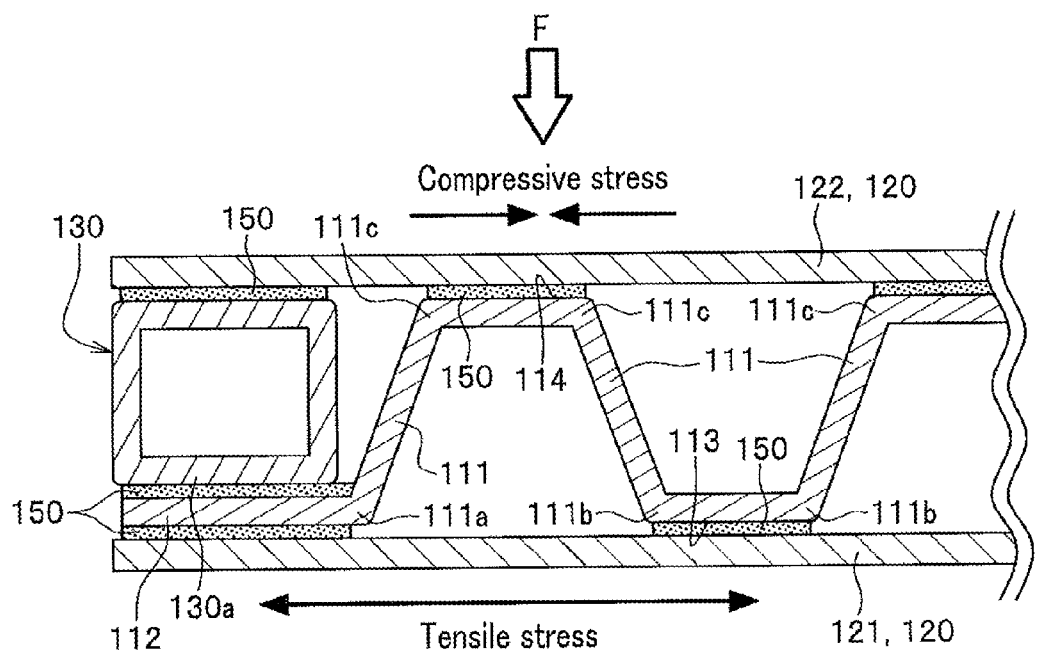
FIG. 6B is an explanatory view of the load when the multi-layer panel according to the first embodiment of the present invention is properly placed.

Therefore, in the present embodiment, when using the multi-layer panel 100 for a panel that allows for mounting the object as shown in FIG. 6B, the multi-layer panel 100 is provided such that the flange 112 of the core panel 110 is placed on an opposite plate (first face plate 121) to a plate (second face plate 122) of the multi-layer panel 100 on which the object is mounted. That is, the multi-layer panel 100 is installed such that the flange 112 of the core panel 110 is clamped between the portion with the rectangular cross section 130a and the face plate opposite to the surface plate of the multi-layer panel 100 on which the object is mounted.

As described above, the multi-layer panel 100 according to the present embodiment may have stronger proof stress against the tensile stress by placing the flange 112 of the core panel 110 on the first face plate 121 on which the tensile stress is applied, and clamping the flange 112 between the portion with the rectangular cross section 130a of the beam member 130 and the first face plate 121.

Note that the cause of the stress is not limited to the load, although the description is made by taking the load (a force vertically generated) as an example and leads to the configuration in which the upper surface of the multi-layer panel 100 is a carriage bed and the reverse surface is one on which the tensile stress is generated. That is, the multi-layer panel 100 may be one that is installed so that a surface on which the tensile stress is generated when receiving an external force F acting on an object is the first face plate 121. For example, when the multi-layer panel 100 according to the present embodiment is used in an application such as receiving an external force F from the lower side to the upper side, the multi-layer panel 100 is arranged so that the surface on which the tensile stress is generated (i.e. outer side of the face plate) is the first face plate 121.

As described above, the mufti-layer panel 100 according to the present embodiment is configured to include: the core panel 110 having the standing portion 111 extending in the direction intersecting with the panel surface; the pair of the face plates 120 (the first face plate 121, the second face plate 122) sandwiching the core panel 110 from both sides; and the beam member 130 having the rectangular cross section 130a clamping with the first face plate 121 the flange 112 of the core panel 110 formed in a manner of extending from the end 111a of the standing portion 111 along the first face plate 121, and thereby to make the flange 112 of the core panel 110 extend between the beam member 130 and the first face plate 121.

The above-described configuration allows the core panel 110 to exist even in the boundary portion between the beam member 130 and the core panel 110 to provide the core panel 110 over the entire surface of the multi-layer panel 100. Accordingly, the above-described configuration, as compared with the comparative example 1 shown in FIG. 5A, may eliminate the portion being locally low in strength and rigidity and suppress the stress concentration to increase the rigidity and strength of the multi-layer panel 100. Further, as in the comparative example 2 shown in FIG. 5B, the present configuration has no need to provide an extension to the end cover member 140 in order to reinforce the portion being low in strength and rigidity, and therefore, may maximize the area of the carriage bed for utilizing the multi-layer panel 100 for the slope 50 without reducing the effectively usable area of the surface material.

<<Modification>>
<Beam Member: Rectangular Block Parts>

Next, a description is given of a modification of the beam member of the multi-layer panel according to the present embodiment.

A multi-layer panel 101 shown in FIG. 7 is provided with a beam member 131 disposed at a periphery (here, the right and left ends) of the multi-layer panel 100.

The beam member 131 includes a plurality of rectangular block parts and has a portion with the rectangular cross section 131a. The multi-layer panel 101 including the beam member 131, similarly to the multi-layer panel 100 shown in FIGS. 3 and 4, may have the flange 112 of the core panel 110 clamped between the portion with the rectangular cross section 131a of the beam member 131 and the first face plate 121, and bonded with the portion with the rectangular cross section 131a and the first face plate 121 using the adhesive agent (not illustrated).

<Beam Member: Protruding Portion>

Figure 8:
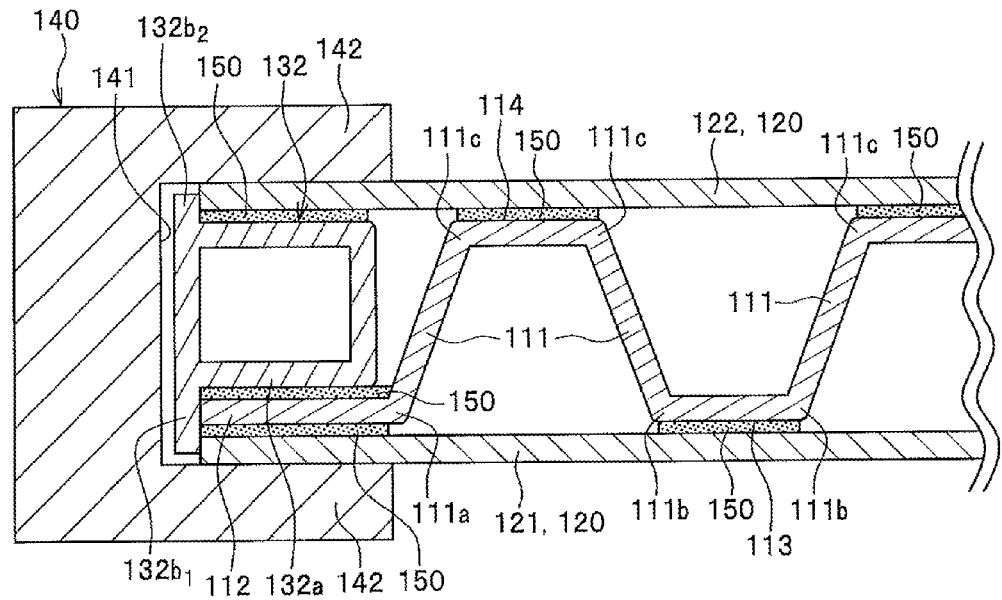
FIG. 8 is a sectional view showing a modification of the beam member of the multi-layer panel according to the embodiment of the present invention.

The multi-layer panel 102 shown in FIG. 8 is provided with a beam member 132 disposed at the periphery (here, the left and right ends) of the multi-layer panel 100.

The beam member 132 includes: a portion with the rectangular cross section 132a between the flange 112 of the core panel 110 and the first face plate 121; a protruding portion 132b1 that protrudes in a direction intersecting with a surface of first face plate 121 and has an inner side of the protruding portion abutted by an end of the face plate 121; and a protruding portion 132b2 that protrudes in a direction intersecting with a surface of the second face plate 122 and has an inner side of the protruding portion abutted by an end of the face plate 122.

The multi-layer panel 102 including the beam member 132 may sandwich the flange 112 of the core panel 110 between the portion with the rectangular cross section 131a of the beam member 130 and the first face plate 121 to bond them with an adhesive 150.

The protruding portion 132b1 is longer than the protruding portion 132b2 in protruding length by a height for sandwiching the flange 112 of the core panel 110 between the portion with the rectangular cross section portion 132a of the beam member 132 and the first face plate 121.

Engaging the protruding portion 132b1 and 132b2 of the beam member 132b in contact with the ends of the pair of the face plates 120 (121, 122) allows positioning the beam member 132 relative to the pair of the face plates 120 (121, 122) of the multi-layer panel 102 to enhance assemblability of the multi-layer panel 102. Further, positioning of the beam member 132 may be made with high accuracy, allowing a high accuracy arrangement of the beam member 132 at a portion required for rigidity and strength.

<Beam Member: Protruding Height of Protruding Portion>

Figure 9:
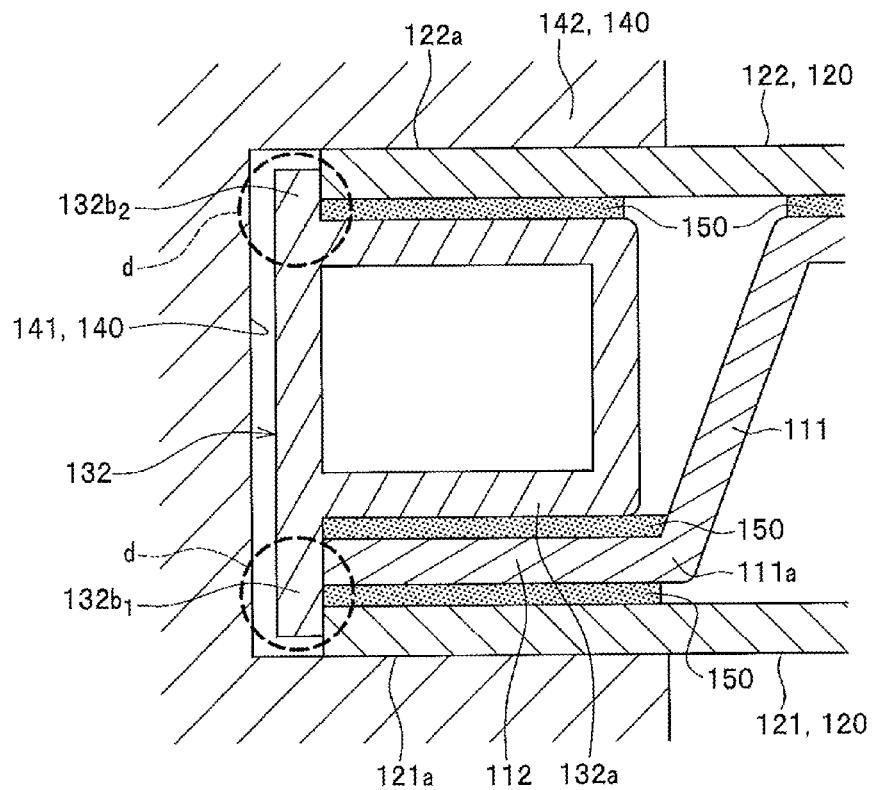
FIG. 9 is an enlarged view a main part of FIG. 8.

As shown in broken line circles "d" in FIG. 9, the lengths of the protruding portions 132b1 and 132b2 of the beam member 132 are respectively set smaller than thicknesses of the pair of the face plates 120 (121 and 122). Specifically, the protruding height of the protruding portion 132b1 of the beam member 132 is set smaller than a length of reaching the outer surface of the first face plate 121. Therefore, the protruding portion 132b1 of the beam member 132b does not protrude beyond the outer surface 121a of the first face plate 121, and thus the protruding portion $132b_1$ does not abut against the inner wall of the clamping portion 142 of the end cover member 140. Similarly, the protruding height of the protruding portion 132b2 of the beam member 132 is set smaller than a length of reaching the outer surface of the second face plate 122. Therefore, the protruding portion 132b2 of the beam member 132 may not protrude beyond the outer surface 122a of the second face plate 122, and thus, the protruding portion 132b2 may not abut against the inner wall of the clamping portion 142 of the end cover member 140.

Here, let assume that the protruding portions 132b1 and 132b2 of the beam member 132 are longer than the thicknesses of respectively corresponding face plates 121 and 122. In such a case, the protruding portions 132b1 and 132b2 would protrude from the surface of the face plates 120 (opposite surfaces to surfaces facing the core panel 110). This causes a situation that a load received by the multi-layer panel 101 would be applied on the protruding portions 132b1 and 132b prior to the pair of the face plates 120, which results in the concentration of the stress into the protruding portions $132b_1$ and 132b2. Setting the lengths of the protruding portions $132b_1$ and 132b2 shorter than the thicknesses of the respectively corresponding face plates 121 and 122 may make the protruding portions $132b_1$ and $132b2$ not protrude beyond the surfaces of the respectively corresponding face plates 121 and 122, to distribute and receive the load on the face plates to suppress the stress concentration.

In addition, when the end portion of the multi-layer panel 102 is clamped by the end cover member 140 (see FIG. 3), the protruding portions $132b_1$ and $132b2$ are out of the way, which enables securely clamping the face plates 120 with the clamping portion 142.

<Coupling Beam Member with Face Plate>

Next, an example of coupling the beam member 130 and the pair of the face plates 120 (121, 122) is described. Note that the "coupling" of the present invention is a concept including any one of adhesion, fastening, and jointing.

Figure 10:
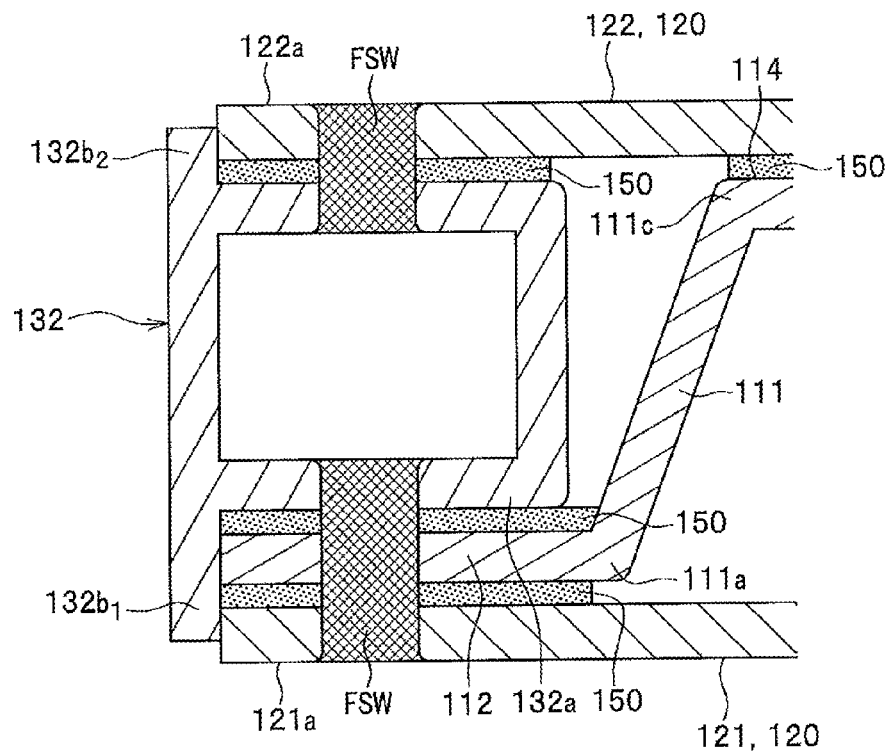
FIG. 10 is a sectional view showing a coupling example of the beam member and the face plates of the multi-layer panel according to the embodiments of the present invention.

FIG. 10 is an explanatory diagram for explaining an example of FSW (Friction Stir Welding).

As shown in FIG. 10 as an example of coupling, the beam member 132 is joined to the pair of the face plates 120 (121, 122) by the friction stir welding (FSW). The example shown in FIG. 10 uses adhesive bonding using adhesive 150 and FSW (see a shaded part in FIG. 10) for coupling the beam member 132, the pair of the face plates 120 (121, 122), and the flange 112 of the core panel 110. The above-mentioned adhesive bonding may interpose the structural adhesive 150 between the beam member 132, the pair of the face plates 120 (121, 122), and the flange 112 of the core panel 110 to bind them.

Figure 11:
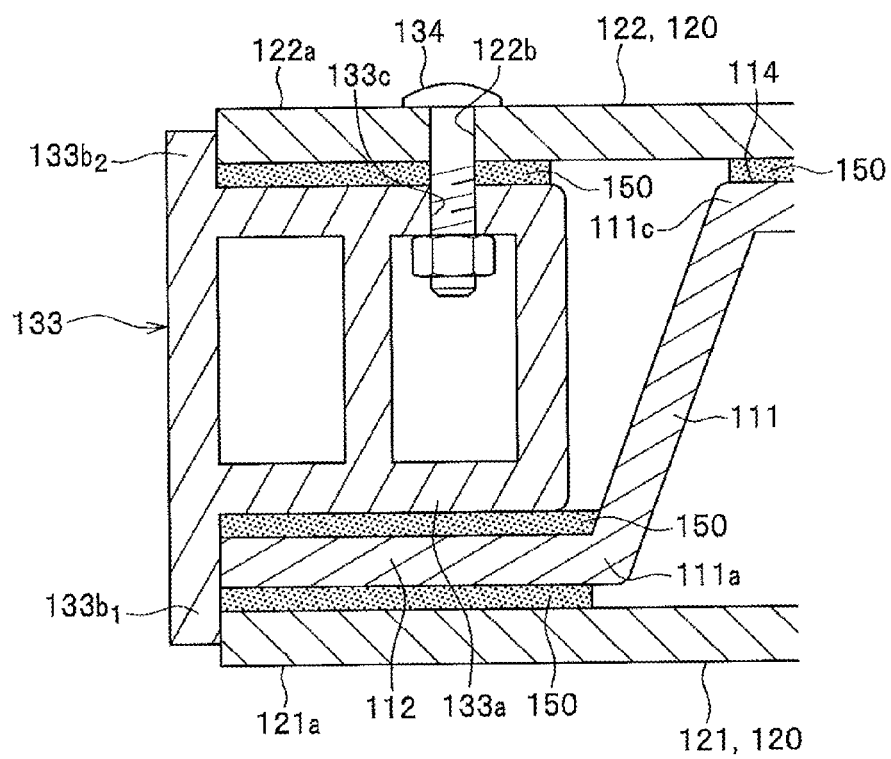
FIG. 11 is a sectional view showing a coupling example of the beam member and the face plates of the multi-layer panel according to the embodiments of the present invention.

FIG. 11 is an explanatory diagram of illustrating an example of the fastening.

As shown in FIG. 11, the beam member 133 includes a portion with the rectangular cross section $133a$ between the flange 112 of the core panel 110 and the first face plate 121; a protruding portion $133b1$ that protrudes from the portion with the rectangular cross section 133 in a direction intersecting with a surface of the first face plate 121 and being in contact with an end of the face plates 121; a protruding portion $133b2$ that protrudes from the portion with the rectangular cross section 133 in a direction intersecting with a surface of the second face plate 122 and being in contact with an end of the second face plate 122; and a through-hole $133c$ that penetrates into an inner cavity of the beam member 133.

The protruding portion $133b1$ is longer than the protruding portion $132b2$ in protruding length by a height for sandwiching the flange 112 of the core panel 110 between the portion with the rectangular cross section portion $133a$ of the beam member 133 and the first face plate 121

Further, the second face plate 122 facing the through-hole $133c$ of the beam member 133 has a through-hole $122a$ formed. The length of the flange 112 of the core panel 110 corresponds to the length of the rectangular section 133 of the beam member 133.

As shown in FIG. 11, first, the beam member 133, the pair of the face plates 120 (121, 122), and the flange 112 of the core panel 110 are adhered by an adhesive 150. Then, as an example of the fastening, a fastener 134 made of a blind rivet or the like is inserted into the through-hole $133c$ of the beam member 133 and the through-hole $122b$ of the second face plate 122, and the fastener 134 may fasten the beam member 133 to the second face plate 122.

Thus, coupling (including jointing, bonding, fastening) the beam member 130 to the face plates may suppress a positional deviation of the beam member 130 with respect to the face plates, and may fix the beam member 130 at a portion where the rigidity and strength are required <Beam Member: Exposed Portion>

Next, a description is made of an example in which a beam member is exposed from the ends of the pair of the face plates 120 (121, 122). The examples of a beam member being exposed from the ends of the pair of the face plates 120 (121, 122) includes, for example, (1) a case in which a beam member constitutes a part of a hinge portion rotatably coupling a plurality of the multi-layer panels; and (2) a case in which a beam member constitutes a part of an attaching component such as an inclined plate to be attached to the ends of the pair of the face plates 120 (121, 122).

(1) A Case of Beam Member Constituting Hinge Portion

Figure 12:
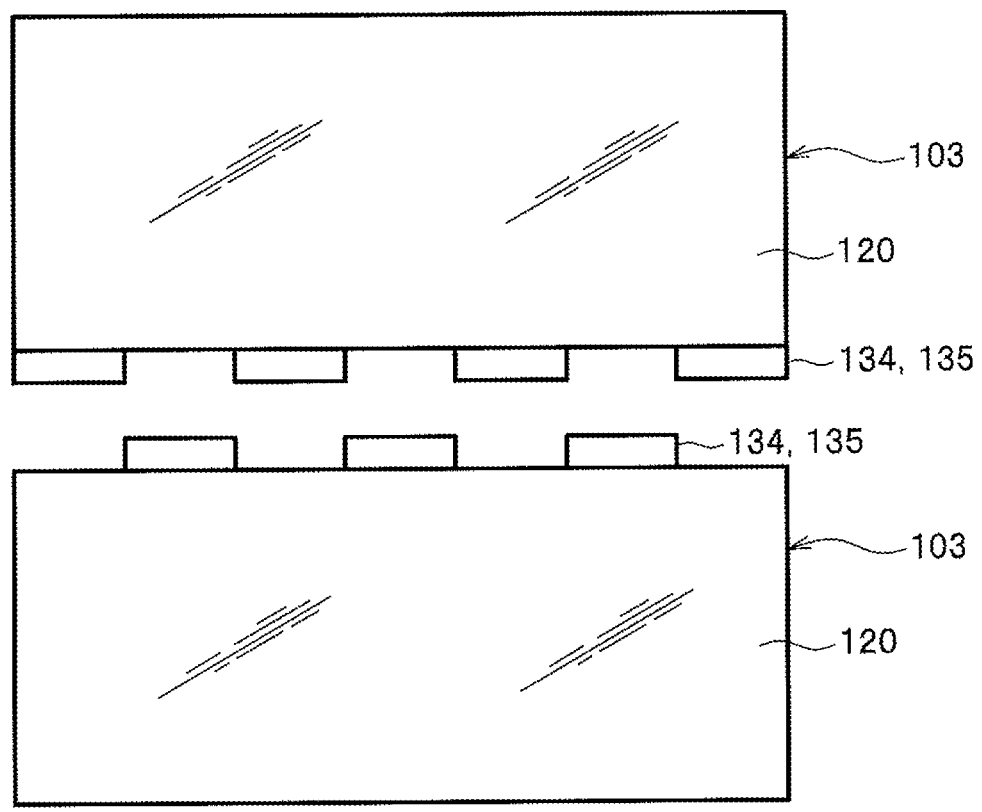
FIG. 12 is a plan view showing a combination of the multi-layer panels when an exposed portion of the beam member of the multi-layer panel according to the embodiment of the present invention includes a hinge.

As shown in FIG. 12, two of the multi-layer panels 103 are provided with two of beam members 134 that are exposed from the upper ends or the lower ends of two pairs of the face plates 120. The two of the beam members 134 include a hinge portion 135 as described below, the two of the multi-layer panels 103 are rotatably connected with each other via the hinge portion 135. The hinge portions 135 of the upper portion and the lower portion of the multi-layer panel 103 are combined alternately with each other.

Figure 13:
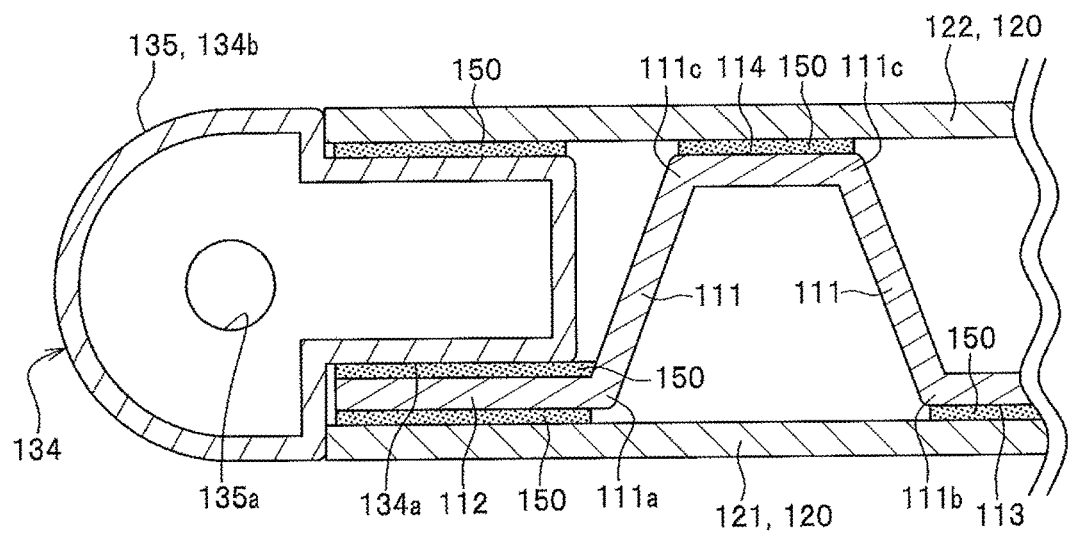
FIG. 13 is a cross-sectional view of a main part of the exposed portion of the beam member of the multi-layer panel according to the embodiment of the present invention when the exposed portion of the beam member includes the hinge.

FIG. 13 illustrates, for example, the multi-layer panel 103 located at the upper side in FIG. 12, among the two of the multi-layer panels 103 that are shown in FIG. 12. As shown in FIG. 13, the multi-layer panels 103 each includes the core panel 110 having the standing portion 111 extending in the direction intersecting with a panel surface, the pair of the face plates 120 (121, 122) sandwiching the core panel 110 from both sides, the beam member 134 that is exposed at the ends of the pair of the face plates 120 (121, 122).

The beam member 134 consists mainly of, for example, a hollow pipe, and includes a portion with the rectangular cross section $134a$ disposed between the flange 112 of the core panel 110 and the second face plate 122, and an exposed portion $134b$ that extends in a direction along the surfaces of the pair of the face plates 120 (121, 122) and is exposed from an end of each of the face plates 120 (121, 122) so as to cover the end portion. The joint portion between the end of the face plates 120 (121, 122) and the exposed portion $134b$ is formed so as to have no difference in level.

However, the core panel 110 of the multi-layer panel 103 shown in FIG. 13 is different from the core panel 110 of the multi-layer panel 100 shown in FIGS. 3 and 4 in an alignment direction of waves of the corrugated plate. That is, the core panel 110 of the multi-layer panel 103 shown in FIG. 13 is the same as that shown in FIG. 3 and FIG. 4 in that the standing portion 111, the first flat portion 113, and the second flat portion 114 form a corrugated plate that has trapezoidal shapes successively repeating in a sectional view, but different in that the standing portion 111 of the core panel 110 of the multi-layer panel 103 shown in FIG. 13 runs in a right to left direction (width direction orthogonal to the end cover member 140) whereas the standing portion 111 of the core panel 110 of the multi-layer panel 100 shown in FIGS. 3 and 4 runs in a top to bottom direction (direction parallel to the end cover member 140 (see FIG. 3)).

Figure 14:
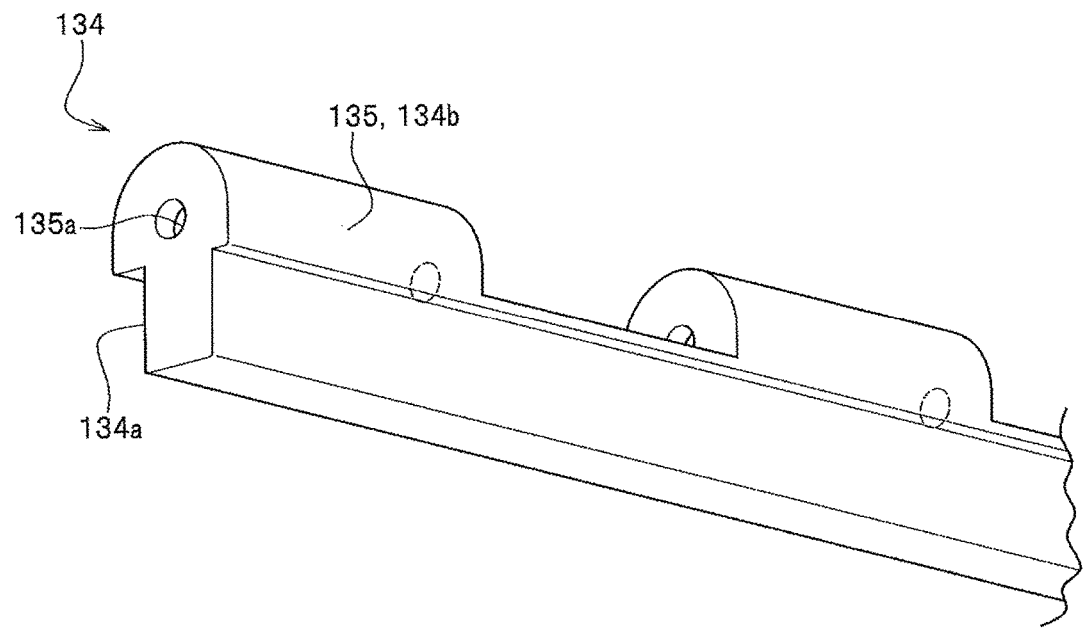
FIG. 14 is a perspective view of the hinge portion when the exposed portion of the beam member of the multi-layer panel according to the embodiment of the present invention is a hinge.

As shown in FIG. 14, the exposed portion $134b$ of the beam member 134 forms a hinge portion 135 by which the multi-layer panels 100 are rotatably supported. Each of the hinge portions 135 is spaced apart from each other. The hinge portion 135 has a through-hole $135a$ produced, which through-hole $135a$ is passed through by a shaft member (not shown).

The above configuration, as shown in FIG. 12, may combine a hinge portion 135 that is the exposed portion $134b$ of the beam member 134 of the upper multi-layer panel 103 with a hinge portion 135 of the beam member 134 of the lower multi-layer panel 103 mutually; pass a shaft member (not shown) through the communicated through-holes 135a of the combined hinge portions 135; and rotatably support the upper multi-layer panel 103 and the lower multi-layer panel 103 using the hinge portions 135.

As described above, making the exposed portion 134b of the beam member 134 become the hinge portion 135, for example, when using the multi-layer panel 100 for the carriage bed of the slope 50 (see FIG. 1), allows easily providing a hinge portion 135 in the slope 50 to enhance usability of the multi-layer panel 100.

Although not illustrated, the exposed portion 134b of the beam member 134 may include a component mounting portion for mounting a predetermined part such as an electric winch in place of the hinge portion 135. Making the exposed portion 134b of the beam member 134 function as a component mounting portion allows for attaching various components to the component mounting portion or mounting the multi-layer panel 103 itself onto a vehicle body part or the like, to enhance the usefulness of the multi-layer panel 100.

Note that the exposed portion 134b may include the hinge portion 135 and one or more component mounting portions other than the hinge portion 135. Further, the exposed portion 134a of the beam member 134 may be arranged on any place. In other words, the configuration of the beam member 134 and the flange 112 of the core panel 110 may be determined according to a desired position where the exposed portion 134a of the beam member 134 is placed (see FIG. 13).

(2) A Case of a Beam Member Constituting a Part of an Attaching Component

Figure 15:
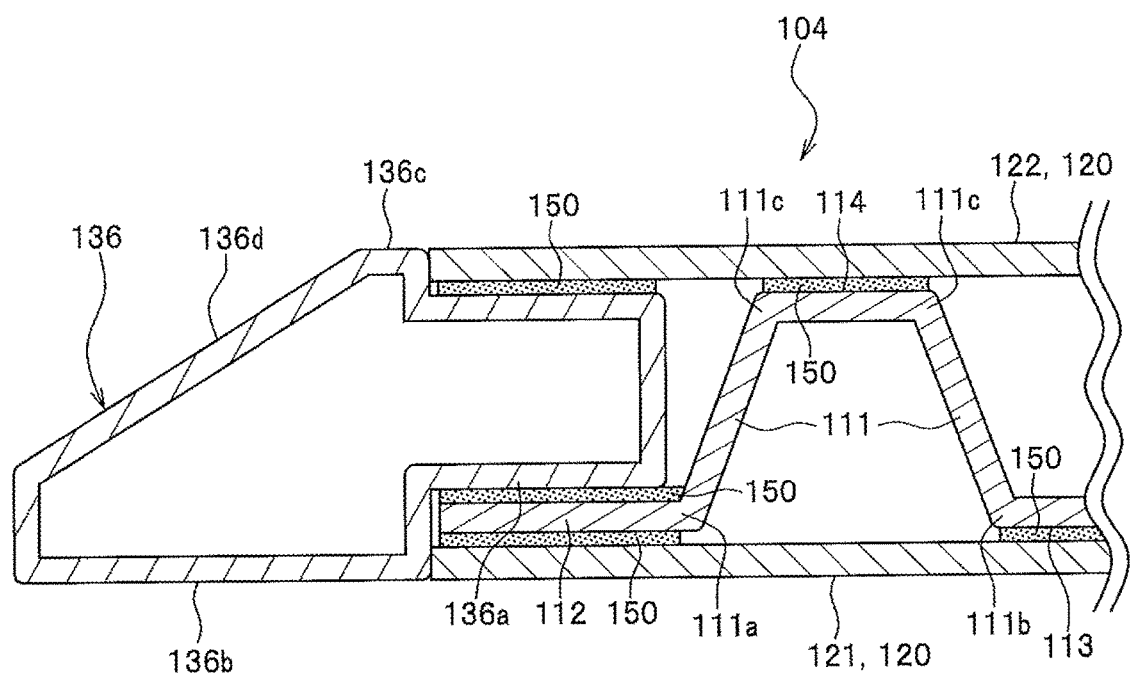
FIG. 15 is a cross-sectional view of a main part of the beam member of the multi-layer panel according to the embodiment of the present invention, when the exposed portion of the beam member includes the inclined surface portion.

As shown in FIG. 15, a beam member 136 may be an attaching component such as an inclined plate, which is attached to the ends of the pair of the face plates 120 (121, 122).

The multi-layer panel 104 shown in FIG. 15 may be applied to the lower stage slope of the slope 50 (see FIG. 1). The multi-layer panel 104 mainly includes: a core panel 110 having a standing portion 111 extending in the direction intersecting with the panel surface; the pair of face plates 120 (121, 122) sandwiching the core panel 110 from both sides; and a beam member 136 that is exposed from the ends of the pair of face plates 120 (121, 122).

The beam member 136 is mainly made of, for example, a hollow pipe, and includes: a portion with the rectangular cross section 136a disposed between the flange 112 of the core panel 110 and the second face plate 122; and an exposed portion 136b that extends in the direction along the surface of the first face plate 121, and is exposed from the end of the face plates 120 (121, 122). The exposed portion 136b includes a flat portion 136c extending outward from the end of the second face plate 122; and an inclined surface portion 136d that is inclined from the front end of the exposed portion 136b to the end of another flat portion 136c. Joint portions between the end of the face plates 120 (121, 122) and the exposed portion 136b are formed such as to have no difference in level.

It should be understood that the core panel 110 of the multi-layer panel 104 shown in FIG. 15 may be the one similar to the core panel 110 of the multi-layer panel 103 shown in FIG. 13, whose standing portion 111 extends in the right-left direction (the width direction that is perpendicular to the end cover member 140 (see FIG. 3)). Further, the multi-layer panel 104 shown in FIG. 15, when applied to the lower stage slope 52 of the slope 50 (see FIG. 1), may have a structure in which a peripheral end portion (bottom end portion) of the multi-layer panel 104 that is in contact with the road surface in developing the slope 50 is the beam member 136 having the flat portion 136c; and a peripheral end portion (top end portion) of the multi-layer panel 104 that is engaged with the first slope 51 of the slope 50 (see FIG. 1) is the beam member 134 having the hinge portion 135.

The multi-layer panel 104, for example when used in the slope 50 (see FIG. 1), may reduce the difference in level between the multi-layer panel 104 and the ground plane by the inclined surface portion 136c to improve mountability of an object (wheelchair, and the like).

[Structure of Hinge Portion]

Next is a description of a structure of the hinge portion of the beam member of the multi-layer panel.

Figure 16A:
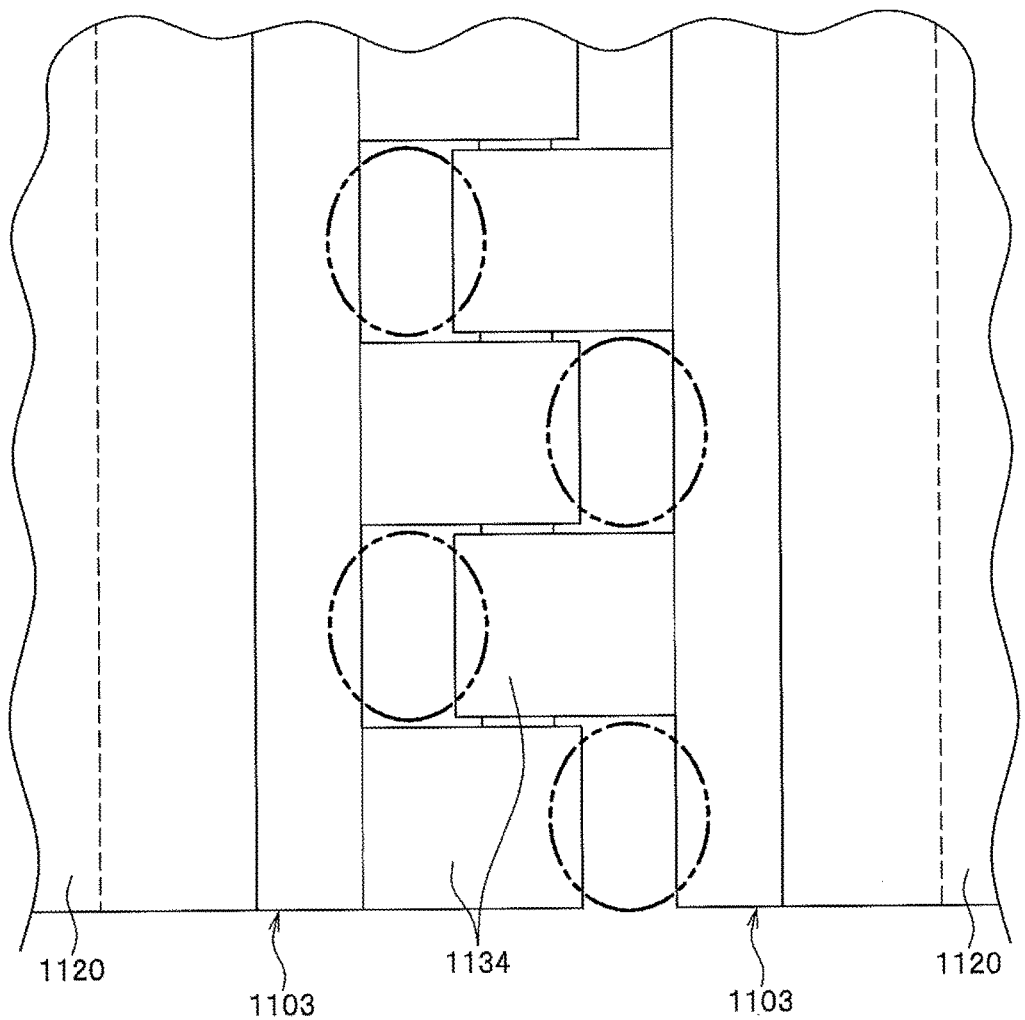
FIG. 16A is a plan view of a hinge portion of a beam member of a multi-layer panel of the comparative example to the multi-layer panel according to the embodiments of the present invention.
Figure 16B:
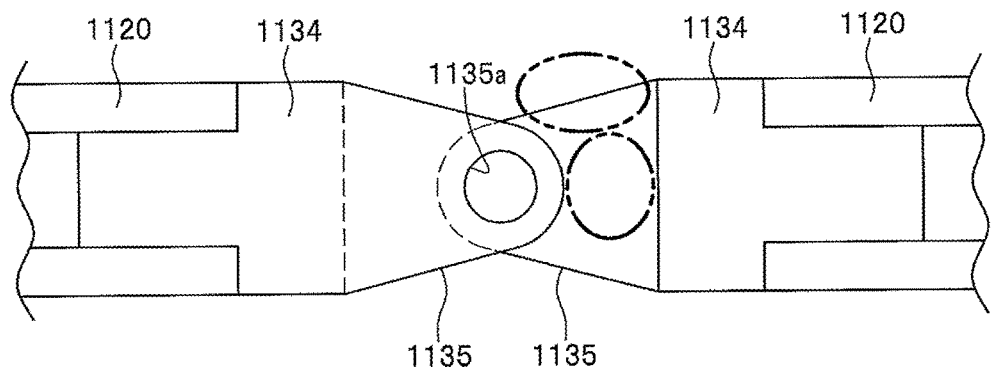
FIG. 16B is a side view of the hinge portion of the beam member of the multi-layer panel of the comparative example to the multi-layer panel according to the embodiments of the present invention.

FIGS. 16A and 16B are explanatory views of the hinge portion of the beam member of the multi-layer panel of the comparative example; FIG. 16A is a plan view thereof, and FIG. 16B is a side view thereof.

As shown in FIGS. 16A and 16B, two of multi-layer panels 1103 of the comparative example include two of beam members 1134 exposed from ends of the two of the face plates 1120; the two of the beam members 1134 each includes a hinge portion 1135; and each of the multi-layer panels 1103 is rotatably connected via the hinge portions 1135. The hinge portion 1135 of a first multi-layer panel 1103 and the hinge portion 1135 of the other multi-layer panel 1103 are meshed with each other. The meshed hinge portions 1135 are combined by a shaft member (not shown) that is inserted into their through-holes 1135a, and thereby rotatably support both of the multi-layer panels 1103.

The structure of the hinge portion of the multi-layer panel 1103 of the comparative example, however, as shown by an area circled by a two-dot chain line in FIGS. 16A and 16B, has a gap formed between the end of the face plates 1120 and the end of the beam member 1134. If this gap is large, a concern may occur, such that a finger of a user may be pinched by the gap, or, a foreign material may enter in the gap.

FIG. 17 is a perspective view of a hinge portion included in a beam member of a multi-layer panel according to an embodiment of the present invention when the exposed portion includes a hinge. A case of using the beam member 137 in the multi-layer panel 100 of FIG. 4 is taken as an example.

As shown in FIG. 17, the beam member 137 is made mainly of, for example, a hollow pipe, and includes: a portion with the rectangular cross section 137a disposed between the flange 112 of the core panel 110 (see FIG. 4) and the second face plate 122 (see FIG. 4); an exposed portion 137b that extends in a direction along the surfaces of the pair of the face plates 120 (see FIG. 4) and is exposed from the end of the pair of the face plates 120 in a manner of covering the end of the exposed portion at the opposing side. Junctions between the end of the face plates 120 and the exposed portion 137b are formed such as to have no difference in level.

The exposed portion 137b of the beam member 137 includes a plurality of hinge portions 138 that are formed at locations spaced apart by a predetermined distance from one another along a longitudinal direction of the beam member 137, and a recess portion 139 formed between respective hinge portions 138.

The hinge portion 138 rotatably supports a first multi-layer panel 100 (see FIG. 4) and a second multi-layer panel 100. An edge 138a of the hinge portion 138 is formed in a curved cross-sectional shape protruding outward. The hinge portion 138 has a through-hole 138b opened, which allows a shaft member (not shown) to pass through.

The recess portion 139 is formed in a curved cross-sectional shape so as to receive an edge portion 138a of each of the hinge portions 138 protruding from the beam member 137 coupled to the other multi-layer panel 100.

Figure 18A:
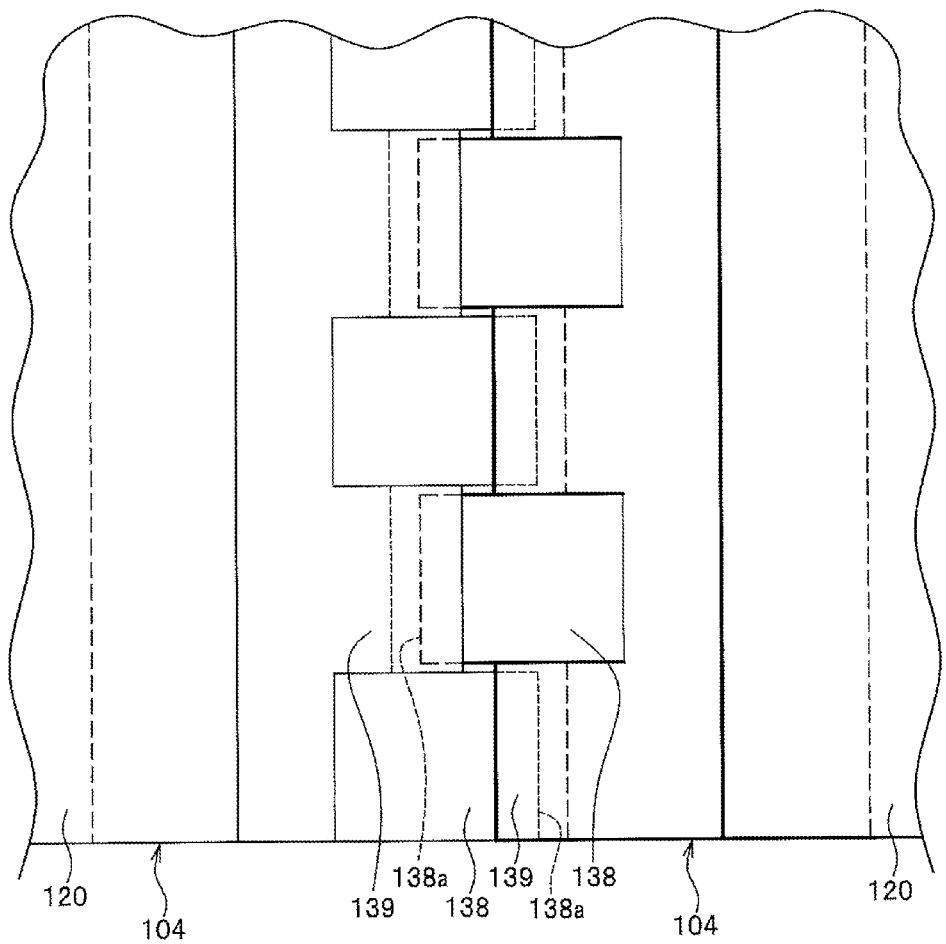
FIG. 18A is a plan view of the hinge portion of the beam member of the multi-layer panel of the present embodiments.
Figure 18B:
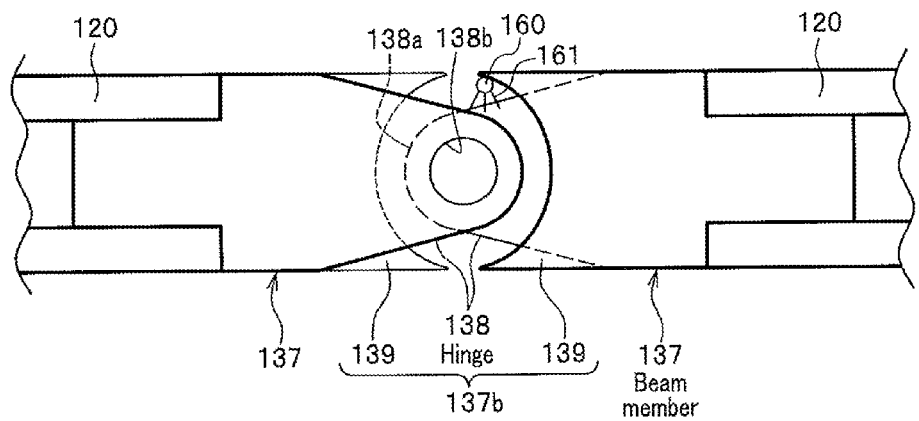
FIG. 18B is a side view of the hinge portion of the beam member of the multi-layer panel of the present embodiments.

FIGS. 18A and 18B are explanatory views of the hinge portions of the beam member of the multi-layer panel of the present embodiment. FIG. 18A is a plan view thereof, and FIG. 18B is a side view thereof.

As shown in FIG. 18A, each of the multi-layer panels 104 of the present embodiment includes the beam members 137 exposed from the ends of the face plate 120. As shown in FIGS. 18A and 18B, the beam member 137 includes the hinge portion 138 and the recess portion 139 of the curved shape. The above configuration shown in FIGS. 18A and 18B may combine the hinge portion 138 of the first multi-layer panel 104 with the hinge portion 138 of the second multi-layer panel 104 mutually; pass a shaft member (not shown) through the communicated through-holes 138a of the combined hinge portions 138; and rotatably support the first multi-layer panel 104 and the second multi-layer panel 104 using the hinge portions 138.

The hinge portions 138 of the first multi-layer panel 104 are rotatably supported together with the hinge portions 138 of the other multi-layer panel 104, and at the same time, the hinge portions 138 of the other multi-layer panel 104 are received in the recess portions 139 of the first multi-layer panel 104, and thereby, the second multi-layer panel 104 is supported so as to rotate about the hinge with respect to the first multi-layer panel 104.

Further, the multi-layer panel 104 of the present embodiment may be provided with a foreign-matter-mixing prevention means between the hinge portion 138 and the recess portion 139. The foreign-matter-mixing prevention means may be, specifically, a rubber sealing member 160, a brush 161 for sweeping foreign substances, or the like, which is attached to an end of the recess portion 139, as shown in FIG. 18B. Providing the rubber sealing member 160, the brush 161, or the like between the hinge portion 138 and the recess portion 139 allows more reliable prevention of the foreign matter from mixing between the hinge portion 138 and the recess portion 139.

<Modification>

Figure 19A:
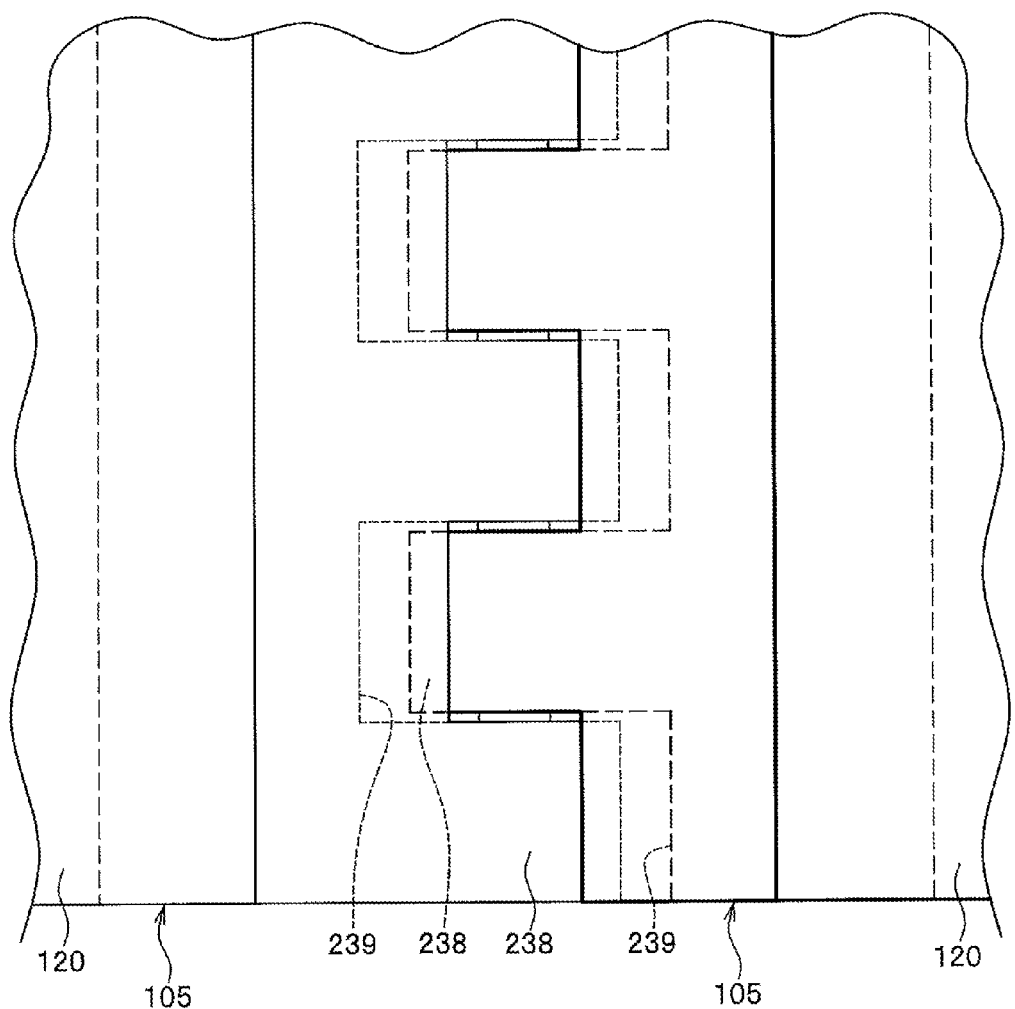
FIG. 19A is a plan view of the hinge portion of the beam member of the multi-layer panel of a modification of the present embodiment.
Figure 19B:
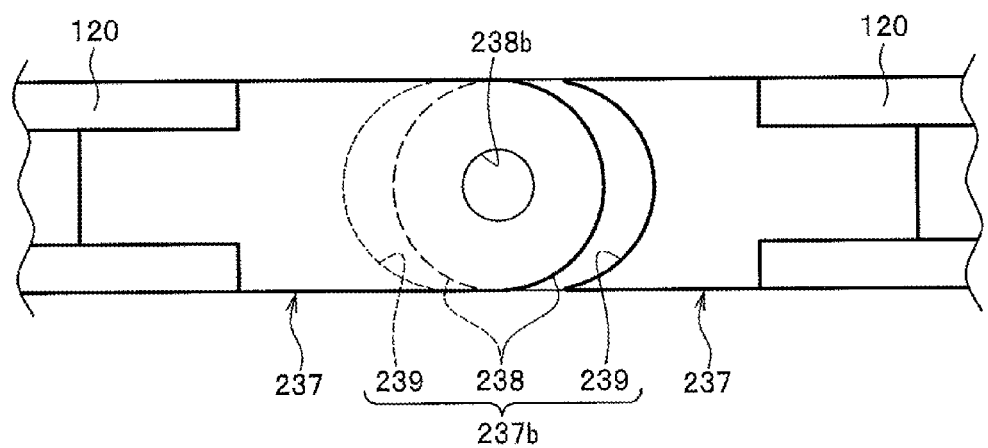
FIG. 19B is a side view of the hinge portion of the beam member of the multi-layer panel of the modification of the present embodiment.

FIGS. 19A and 19B are explanatory views of a modification of the hinge portion of the beam member of the multi-layer panel FIG. 19A is a plan view thereof, and FIG. 19B is a side view thereof.

As shown in FIG. 19A, each of multi-layer panels 105 of the present embodiment includes a beam member 237 exposed from the end of each of the face plates 120. The beam member 237 includes an exposed portion 237b which extends in a direction along the surface of each of the face plates 120, and is exposed from the ends of each of the face plate 120 so as to cover the ends of the pair of face plate 120. The exposed portion 237b includes a plurality of hinge portions 238 that are formed at locations spaced apart by a predetermined distance from one another along a longitudinal direction of the beam member 237, and recess portions 239 formed between hinge portions 238.

The hinge portion 238 rotatably supports the first multi-layer panel 105 and the second multi-layer panel 105. The hinge portion 238 is formed in a semicircular shape in a cross sectional view. The hinge portion 238 has a through-hole 238b that allows the shaft member (not shown) to pass through bored.

The recess portion 239 is formed in a curved cross-sectional shape that may receive a semicircular edge portion of each hinge portion 238 that protrudes from the beam member 237 coupled to the second multi-layer panel 105.

Note that this modification may have a configuration in which the multi-layer panels 105 are provided with a foreign-matter-mixing prevention means between the hinge portion 238 and the recess portion 239, similarly to the case of FIG. 18B.

[End Portion Reinforcing Structure of Multi-Layer Panel]

Next is a description of an end portion reinforcing structure of the multi-layer panel.

FIGS. 20A to 20E are cross-sectional views illustrating the end portion reinforcing structure of the multi-layer panel according to the embodiments of the present invention. A case that examines items such as lengths of respective portions of the multi-layer panel 100 in FIG. 4 is taken as an example. Note that an illustration of the adhesive 150 is omitted, and that the end portion and the end covering member 140 of the multi-layer panel 100 is fastened by a screw 151.

First, as shown in FIGS. 20A to 20D, multi-layer panels 100A to 100D include a standing portion 111 extending in a direction intersecting with a panel surface; a core panel 110 including a flange 112 formed so as to extend from an end 111a of the standing portion 111 along the panel surface; a pair of face plates 121 and 122 sandwiching the core panel 110 from both sides; and beam members 130A to 130D that have portion with the rectangular cross sections 130a arranged that sandwiches the flange 112 of the core panel 110 with the first face plate 121. Further, the end portions of the multi-layer panels 100A to 100D are each clamped by a clamping portion 142 of an end cover member 140 to be reinforced.

Figure 20A:
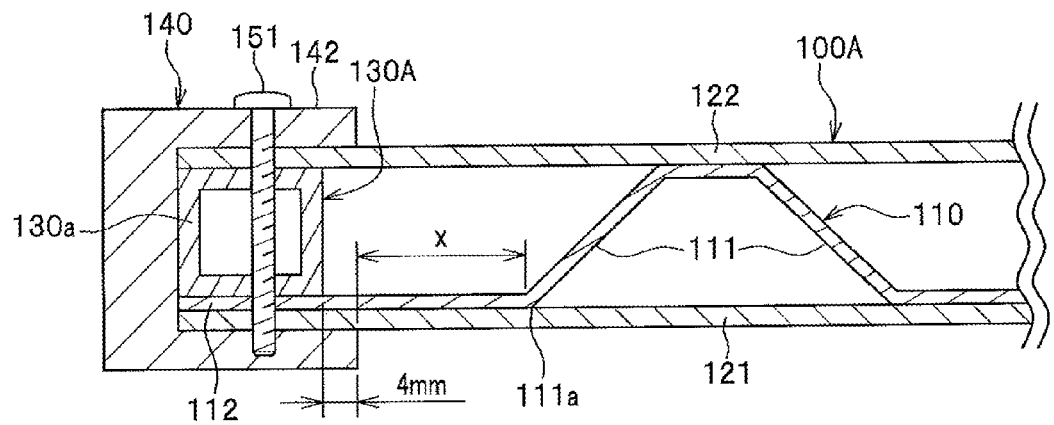
FIG. 20A is a sectional view for explaining a reinforcing structure of an end portion of the multi-layer panel according to an embodiment of the present invention.
Figure 20B:
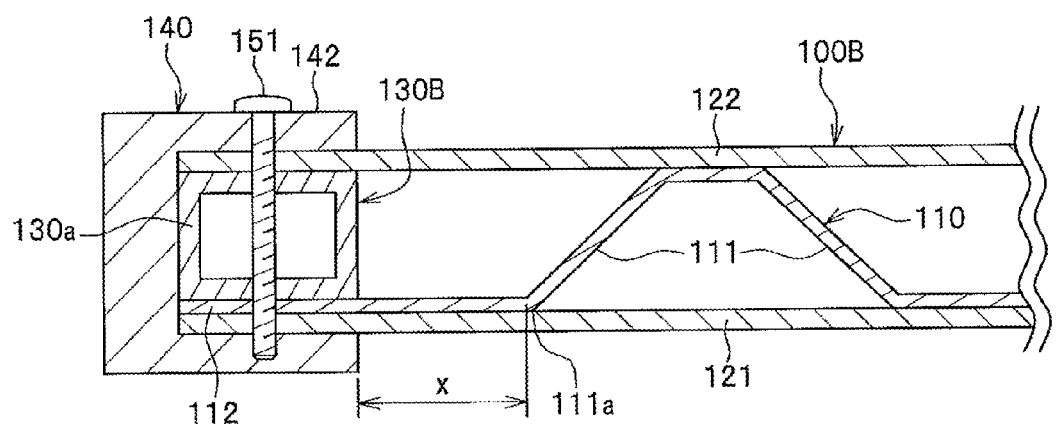
FIG. 20B is a sectional view for explaining a reinforcing structure of an end portion of the multi-layer panel according to an embodiment of the present invention.
Figure 20C:
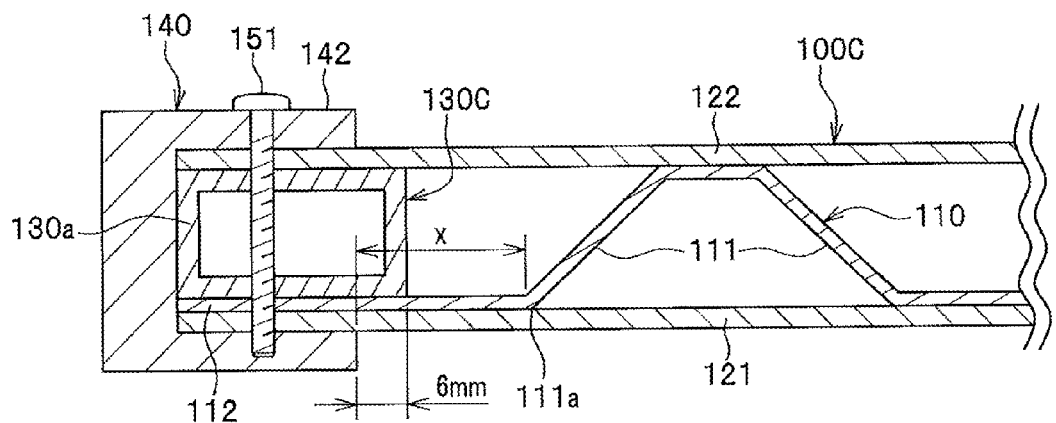
FIG. 20C is a sectional view for explaining a reinforcing structure of an end portion of the multi-layer panel according to an embodiment of the present invention.
Figure 20D:
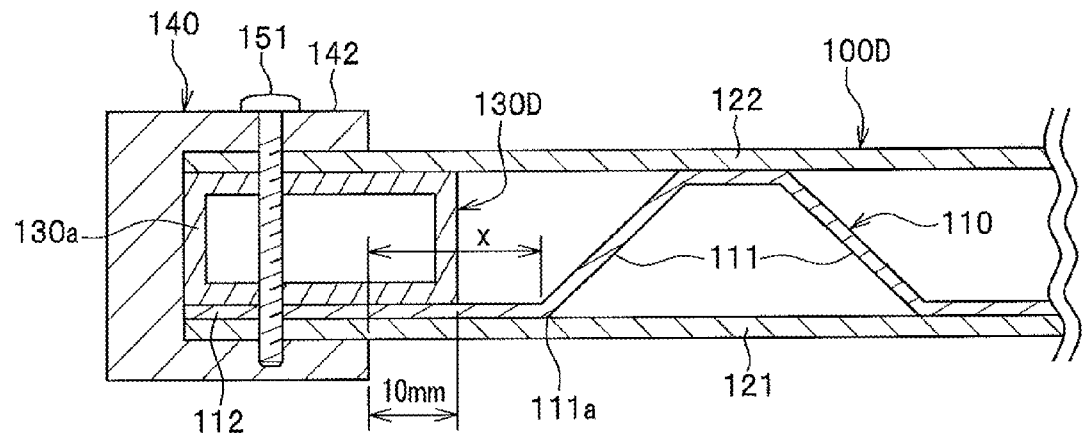
FIG. 20D is a sectional view for explaining a reinforcing structure of an end portion of the multi-layer panel according to an embodiment of the present invention.
Figure 20E:
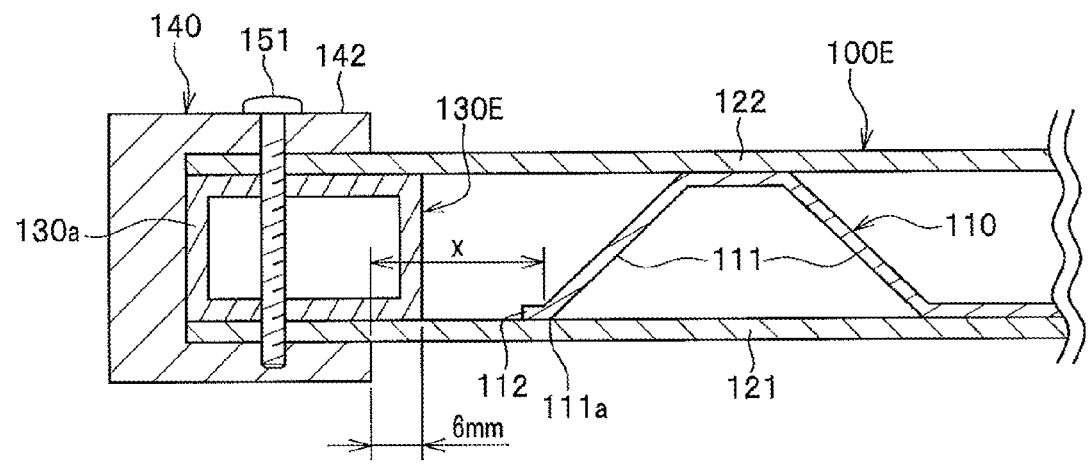
FIG. 20E is a sectional view for explaining a reinforcing structure of an end portion of the multi-layer panel according to an embodiment of the present invention.

Note that a multi-layer panel 100E of a comparative example E shown in FIG. 20E fails to have the flange 112 clamped between first face plate 121 and a portion with the rectangular cross section 130a of the beam member 130. That is, the multi-layer panel 100E of the comparative example E fails to fulfill a requirement for the multi-layer panel of the present invention.

In FIGS. 20A to 20 E, length "a" is a distance between an end surface of the clamping portion 142 of the end cover member 140 and an end surface of the portion with the rectangular cross section 130a of the beam members 130A to E (taking a direction going near the core panel 110 as positive). And, the load point x is a distance from the end surface of the clamping portion 142 of the end cover member 140 to an end 111a of the standing portion 111 (an end 111a at a side closer to the beam member 130). In the comparative examples A to E, the load point x is set to 14 mm in common.

As shown in FIG. 20A, the comparative example A has a beam member 130A included in the inside of the clamping portion 142 of the end cover member 140 in the direction perpendicular to the end portion of the multi-layer panel 100C. Length "a" that is a distance between the end surface of the clamping portion 142 and the end surface of the portion with the rectangular cross section 130a of the beam members 130C is −4 mm.

As shown in FIG. 20B, the comparative example B has an end surface of a beam member 130B and an end surface of the clamping portion 142 of the end cover member 140 that are formed in flush in a direction perpendicular to an end portion of the multi-layer panel 100B. The length "a" that is the distance between the end surface of the clamping portion 142 and the end surface of the portion with the rectangular cross section 130a of the beam member 130C is 0 mm.

As shown in FIG. 20C, the comparative example C has a beam member 130C that is formed such as to protrude from the clamping portion 142 of the end cover member 140 in a direction perpendicular to the end portion of the multi-layer panel 100C. The length "a" that is the distance between the end surface of the clamping portion 142 and the end surface of the portion with the rectangular cross section 130a of the beam member 130C is 10 mm.

As shown in FIG. 20D, the comparative example D has a beam member 130D that is formed such as to protrude from the clamping portion 142 of the end cover member 140 in a direction perpendicular to the end portion of the multi-layer panel 100D. The length "a" that is the distance between the end surface of the clamping portion 142 and the end surface of the portion with the rectangular cross section 130a of the beam member 130D is 10 mm.

As shown in FIG. 20E, the comparative example E has a beam member 130E that is formed such as to protrude from the clamping portion 142 of the end cover member 140 in a direction perpendicular to the end portion of the multi-layer panel 100E, but, a flange 112 is not clamped between the first face plate 121 and the portion with the rectangular cross section 130a of the beam member 130. The length "a" that is the distance between the end surface of the clamping portion 142 and the end surface of the portion with the rectangular cross section 130a of the beam member 130D is 6 mm.

Figures 21, 22:
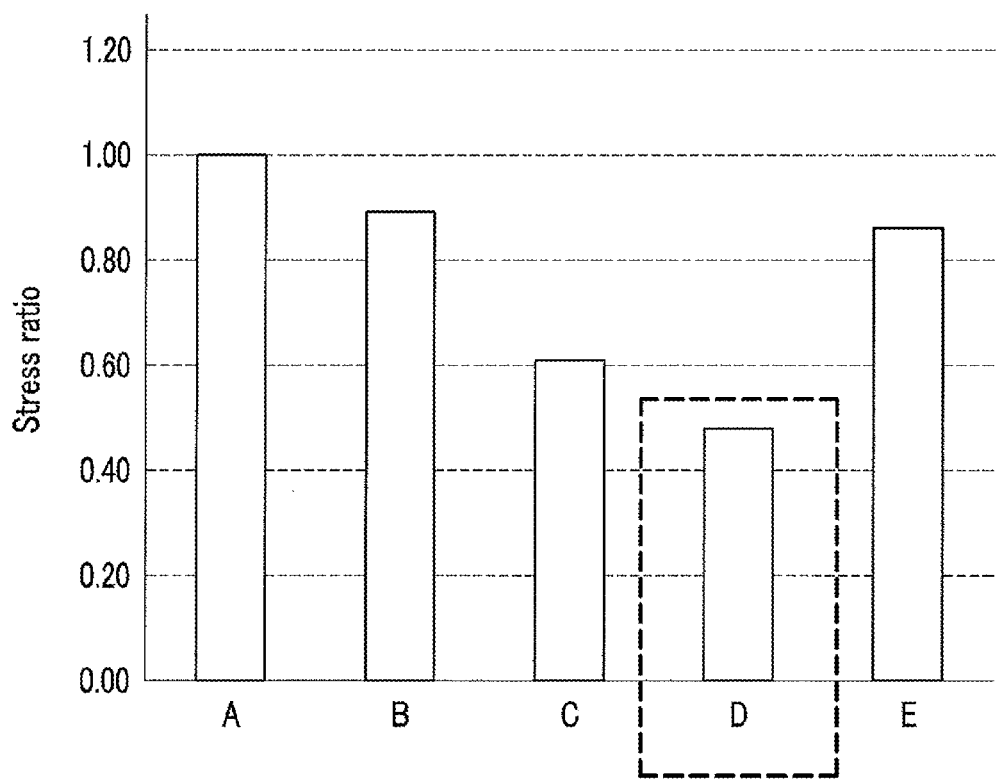
FIG. 21 is a diagram showing a table of an analysis result of a generated stress ratio at a load point of the multi-layer panel of the comparative examples A to E of the multi-layer panel according to the embodiment of the present invention.
FIG. 22 is a graph showing the analysis result of the generated stress ratio at the load point of the multi-layer panel of the comparative examples A to E of the multi-layer panel according to the embodiment of the present invention.

FIG. 21 is a table diagram showing a result of an analysis of generated stress ratio at the load point x of the multi-layer panels 100A to 100E of the comparative examples A to E, which result is also shown by a graph of FIG. 22.

As shown in FIGS. 21 and 22, it has been proven that the multi-layer panel 100D of the comparative example D provides the smallest ratio of generated stresses and is the best mode providing the excellent end portion reinforcement. The multi-layer panel 100D of the comparative example D has the beam member 130D that is formed such as to protrude from the clamping portion 142 of the end cover member 140 in a direction perpendicular to the end portion of the multi-layer panel. The length "a" that is the distance between the end surface of the clamping portion 142 and the end surface of the portion with the rectangular cross section 130a of the beam member 130D is 10 mm.

As described above, the multi-layer panel 100D that is the best mode, may employs a configuration of changing rigidity in a stepwise manner from the clamping portion 142, toward the beam member portion (beam member 130D), core panel 110, and further the face plates 121 and 122, to disperse the stress, and to reduce the stress that tends to concentrate locally.

As above, the description is made of the present embodiments, the modifications, and the comparative examples, but the present invention is not limited to the above-described embodiments, modifications, and comparative examples, and may be modified appropriately as needed without departing from the scope of the present invention. For example, the multi-layer panels according to the present embodiments are not limited to be used for a slope. Furthermore, the number of stages of the slope may be also freely designed, and the slope may be of a single plate.

REFERENCE SIGNS LIST

1: vehicle
2: vehicle body
3: back door
5: vehicle rear opening
6: rear floor
50: slope
51: first slope
52: second slope
51b, 52b: rail
100, 100A to 100D, 101, 102, 104, 105: multi-layer panel
110: core panel
111: standing portion
111a: end
111b: first folded portion
111c: second folded portion
110: core panel
112: flange (flat portion)
113: first flat portion
114: second flat portion
120: pair of face plates
121: first face plate
122: second face plate
130, 131, 132, 133, 134, 136: beam member
130a, 131a, 132a, 133a, 136a: portion with rectangular cross section
132b1, 132b2: protruding portion
133c, 135a: through-hole
134a, 134b, 137b, 237b: exposed portion
135, 138, 238: hinge portion
136c: inclined surface portion
137, 237: beam member
138a: edge portion of hinge portion
139, 239: recess portion
140: end cover member
141: groove portion
142: clamping portion
150: adhesive agent
160: rubber seal member (foreign-matter-mixing prevention means)
161: brush (foreign-matter-mixing prevention means)

The invention claimed is:
1. A multi-layer panel comprising:
a core panel;
a pair of face plates configured to sandwich the core panel from both sides; and
a beam member,
the core panel including:
a standing portion configured to extend in a direction intersecting with a surface of the multi-layer panel; and
a flat portion formed in a manner of extending along the surface of the multi-layer panel from an end of the standing portion,
the beam member configured to be disposed along an end of the face plate and to have a portion with a rectangular cross section disposed so as to sandwich the flat portion of the core panel with a first one of the face plates,
the beam member including an exposed portion, the exposed portion configured to be provided immediately beside ends of the pair of the face plates, to extend from the portion with the rectangular cross section in a direction along surfaces of the pair of the face plates, and to be exposed from the ends of the pair of the face plates, and
the exposed portion configured to include a hinge portion or a component mounting portion on which a component is mounted, wherein
a plurality of the hinge portions are formed at locations spaced apart by a predetermined distance from one another along a longitudinal direction of the beam member;
a plurality of recess portions are formed between the plurality of the hinge portions;
a cross-sectional shape of an edge of each of the plurality of the hinge portions that protrudes from the beam member is formed in a curved cross-sectional shape;
a cross-sectional shape of each of the plurality of the recess portions is formed in a curved cross-sectional shape that is able to receive the edge of each of the plurality of the hinge portions; and
when two of the multi-layer panels are coupled,
the plurality of the hinge portions of a first multi-layer panel are engaged with the plurality of the recess portions of a second multi-layer panel, and thereby, the second multi-layer panel is supported rotatably with respect to the first multi-layer panel.

2. The multi-layer panel according to claim 1, comprising a foreign-matter-mixing prevention means between each of the plurality of the hinge portions and each of the plurality of the recess portions.

3. The multi-layer panel according to claim 1, wherein the beam member is coupled to the pair of the face plates by jointing, adhesion, or fastening.

4. The multi-layer panel according to claim 1, wherein the flat portion of the core panel is clamped between the portion with the rectangular cross section of the beam member and a first one of the pair of the face plates that is an opposite face plate to a face plate receiving an external force.

5. A multi-layer panel comprising:
a core panel;
a pair of face plates configured to sandwich the core panel from both sides; and
a beam member,
the core panel including:
    a standing portion configured to extend in a direction intersecting with a surface of the multi-layer panel; and
    a flat portion formed in a manner of extending along the surface of the multi-layer panel from an end of the standing portion,
the beam member configured to be disposed along an end of the face plate and to have a portion with a rectangular cross section disposed so as to sandwich the flat portion of the core panel with a first one of the face plates, and
the beam member including an exposed portion, the exposed portion configured to be provided immediately beside ends of the pair of the face plates, to extend from the portion with the rectangular cross section in a direction along surfaces of the pair of the face plates, and to be exposed from the ends of the pair of the face plates,
wherein
the exposed portion includes an inclined surface portion configured to be inclined from the first one of the face plates toward a second one of the face plates.

* * * * *